United States Patent
Lim et al.

(10) Patent No.: US 8,660,375 B2
(45) Date of Patent: Feb. 25, 2014

(54) IMAGE CODING METHOD, IMAGE DECODING METHOD, IMAGE CODING APPARATUS, IMAGE DECODING APPARATUS, AND IMAGE CODING AND DECODING APPARATUS

(75) Inventors: Chong Soon Lim, Singapore (SG); Viktor Wahadaniah, Singapore (SG); Sue Mon Thet Naing, Singapore (SG); Takahiro Nishi, Nara (JP); Youji Shibahara, Osaka (JP); Hisao Sasai, Osaka (JP); Toshiyasu Sugio, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/400,793

(22) Filed: Feb. 21, 2012

(65) Prior Publication Data

US 2012/0224774 A1 Sep. 6, 2012

Related U.S. Application Data

(60) Provisional application No. 61/445,258, filed on Feb. 22, 2011, provisional application No. 61/509,167, filed on Jul. 19, 2011.

(51) Int. Cl.
*G06K 9/46* (2006.01)

(52) U.S. Cl.
USPC .............. 382/233; 375/240.03; 375/240.12; 375/240.23; 710/23

(58) Field of Classification Search
None
See application file for complete search history.

(56) References Cited

U.S. PATENT DOCUMENTS

| | | | |
|---|---|---|---|
| 7,095,787 B2 | 8/2006 | Kadono et al. |
| 7,742,531 B2 | 6/2010 | Xue et al. |
| 7,782,962 B2 | 8/2010 | Xue et al. |
| 7,792,195 B2 | 9/2010 | Xue et al. |
| 7,899,123 B2 | 3/2011 | Xue et al. |
| 8,254,468 B2 | 8/2012 | Xue et al. |
| 8,345,770 B2 | 1/2013 | Xue et al. |
| 8,369,421 B2 | 2/2013 | Kadono et al. |
| 8,488,683 B2 | 7/2013 | Xue et al. |

(Continued)

FOREIGN PATENT DOCUMENTS

| | | |
|---|---|---|
| JP | 2004-180248 | 6/2004 |
| JP | 2012-147191 | 8/2012 |

(Continued)

OTHER PUBLICATIONS

ITU-T, H.264, "Series H: Audiovisual and Multimedia Systems—Infrastructure of audiovisual services—Coding of moving video", Mar. 2010.

(Continued)

*Primary Examiner* — Tsung-Yin Tsai
(74) *Attorney, Agent, or Firm* — Wenderoth, Lind & Ponack, L.L.P.

(57) ABSTRACT

The image coding method is used to code images to generate a coded stream. The image coding method includes: writing, into a sequence parameter set in the coded stream to be generated, a first parameter representing a first bit-depth that is a bit-depth of a reconstructed sample in the images; and writing, into the sequence parameter set, a second parameter which is different from the first parameter and represents a second bit-depth that is a bit-depth of an Intra Pulse Code Modulation (IPCM) sample in the images.

4 Claims, 32 Drawing Sheets

(56) References Cited

U.S. PATENT DOCUMENTS

| | | | |
|---|---|---|---|
| 2004/0062310 | A1 | 4/2004 | Xue et al. |
| 2004/0076237 | A1 | 4/2004 | Kadono et al. |
| 2006/0010264 | A1* | 1/2006 | Rader et al. ............. 710/23 |
| 2006/0239360 | A1 | 10/2006 | Kadono et al. |
| 2007/0092002 | A1 | 4/2007 | Xue et al. |
| 2007/0098066 | A1 | 5/2007 | Xue et al. |
| 2007/0104269 | A1 | 5/2007 | Xue et al. |
| 2008/0049843 | A1 | 2/2008 | Kadono et al. |
| 2008/0056353 | A1 | 3/2008 | Xue et al. |
| 2008/0056602 | A1 | 3/2008 | Xue et al. |
| 2008/0056603 | A1 | 3/2008 | Xue et al. |
| 2008/0063084 | A1 | 3/2008 | Xue et al. |
| 2008/0069245 | A1 | 3/2008 | Kadono et al. |
| 2008/0130761 | A1 | 6/2008 | Kadono et al. |
| 2008/0219354 | A1* | 9/2008 | Segall et al. ............. 375/240.23 |
| 2009/0175334 | A1* | 7/2009 | Ye et al. ............. 375/240.12 |
| 2011/0103488 | A1 | 5/2011 | Xue et al. |
| 2012/0213274 | A1 | 8/2012 | Lim et al. |
| 2013/0101025 | A1* | 4/2013 | Van der Auwera et al. ..... 375/240.03 |
| 2013/0101031 | A1* | 4/2013 | Van der Auwera et al. ..... 375/240.12 |
| 2013/0195207 | A1 | 8/2013 | Xue et al. |

FOREIGN PATENT DOCUMENTS

| | | |
|---|---|---|
| WO | 2012/008130 | 1/2012 |
| WO | 2012/096201 | 7/2012 |
| WO | 2012-114724 | 8/2012 |
| WO | 2012/165095 | 12/2012 |

OTHER PUBLICATIONS

International Search Report issued May 22, 2012 in International (PCT) Application No. PCT/JP2012/001168.

Keiichi Chono et al., Pulse code modulation mode for HEVC, Joint Collaborative Team on Video Coding (JCT-VC) of ITU-T SG16 WP3 and ISO/IEC JTC1/SC29/WG11, JCTVC-DO44-rev1, 4$^{th}$ Meeting: Daegu, Korea, Jan. 2011, pp. 1-9.

Keiichi Chono et al., Proposal of enhanced PCM coding in HEVC, Joint Collaborative Team on Video Coding (JCT-VC) of ITU-T SG16 WP3 and ISO/IEC JTC1/SC29/WG11, Document: JCTVC-E192-r2, 5th Meeting: Geneva, CH, Mar. 2011, pp. 1-12.

Thomas Wiegand et al., "WD1: Working Draft 1 of High-Efficiency Video Coding", Joint Collaborative Team on Video Coding (JCT-VC) of ITU-T SG16 WP3 and ISO/IEC JTC1/SC29/WG11, JCTVC-C403, Ver. 1, 3rd Meeting: Guangzhou, CN, Oct. 7-15, 2010.

Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, Ver.8, 5th Meeting: Geneva, CH, Mar. 16-23, 2011.

International Search Report issued May 22, 2012 in International Application No. PCT/JP2012/001167.

International Search Report issued Oct. 9, 2012 in International Application No. PCT/JP2012/004460.

ISO/IEC 14496-10 Information technology—Coding of audio-visual objects—"MPEG-4 Part 10 Advanced Video Coding" Oct. 1, 2004.

Keiichi Chono et al., "Proposal of enhanced PCM coding in HEVC", Joint Collaborative Team on Video Coding (JCT-VC) of ITU-T SG16 WP3 and ISO/IEC JTC1/SC29/WG11, JCTVC-E192-r2, 5th Meeting: Geneva, CH, Mar. 2011, pp. 1-12.

Anand Kotra et al., Deblocking bug fix for CU-Varying QP's and IPCM blocks., Joint Collaborative Team on Video Coding (JCT-VC) of ITU-T SG16 WP3 and ISO/IEC JTC1/SC29/WG11, JCTVC-G640-r3, 7th Metting: Geneva, CH, Nov. 2011, pp. 1-14.

Geert Van der Auwera et al., AHG6: Deblocking of IPCM Blocks Containing Reconstructed Samples, Joint Collaborative Team on Video Coding (JCT-VC) of ITU-T SG16 WP3 and ISO/IEC JTC1/SC29/WG11, JCTVC-H0448, 8th Meeting: San Jose, CA, USA, Feb. 2012, pp. 1-6.

Keiichi Chono et al., AHG6: Report on unified QP derivation process in deblocking of I_PCM regions (draft), Joint Collaborative Team on Video Coding (JCT-VC) of ITU-T SG16 WP3 and ISO/IEC JTC1/SC29/WG11, JCTVC-I0035-r1, 9th Meeting: Geneva, CH, Apr. 2012, pp. 1-15.

Geert Van der Auwera et al., "Deblocking of IPCM Blocks Containing Reconstructed Samples", Joint Collaborative Team on Video Coding (JCT-VC) of ITU-T SG16 WP3 and ISO/IEC JTC1/SC29/WG11, JCT-VC-G138, 7$^{th}$ Meeting: Geneva, Nov. 21-30, 2011.

* cited by examiner

FIG. 4

(a)
- 402 — bit_depth_luma_minus8 = 0 (Bit-Depth of Reconstructed Samples: 8)
- 404 — bit_depth_chroma_minus8 = 0 (Bit-Depth of Reconstructed Samples: 8)
- 406 — pcm_bit_depth_luma_minus1 = 7 (Bit-Depth of IPCM Samples: 8)
- 408 — pcm_bit_depth_chroma_minus1 = 7 (Bit-Depth of IPCM Samples: 8)

(b)
- 410 — bit_depth_luma_minus8 = 0 (Bit-Depth of Reconstructed Samples: 8)
- 412 — bit_depth_chroma_minus8 = 0 (Bit-Depth of Reconstructed Samples: 8)
- 414 — pcm_bit_depth_luma_minus1 = 9 (Bit-Depth of IPCM Samples: 10)
- 416 — pcm_bit_depth_chroma_minus1 = 9 (Bit-Depth of IPCM Samples: 10)

(c)
- 418 — bit_depth_luma_minus8 = 2 (Bit-Depth of Reconstructed Samples: 10)
- 420 — bit_depth_chroma_minus8 = 2 (Bit-Depth of Reconstructed Samples: 10)
- 422 — pcm_bit_depth_luma_minus1 = 7 (Bit-Depth of IPCM Samples: 8)
- 424 — pcm_bit_depth_chroma_minus1 = 7 (Bit-Depth of IPCM Samples: 8)

FIG. 22

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 33
| Corresponding standard | Driving frequency |
|---|---|
| MPEG-4 AVC | 500 MHz |
| MPEG-2 | 350 MHz |
| ⋮ | ⋮ |
FIG. 34A
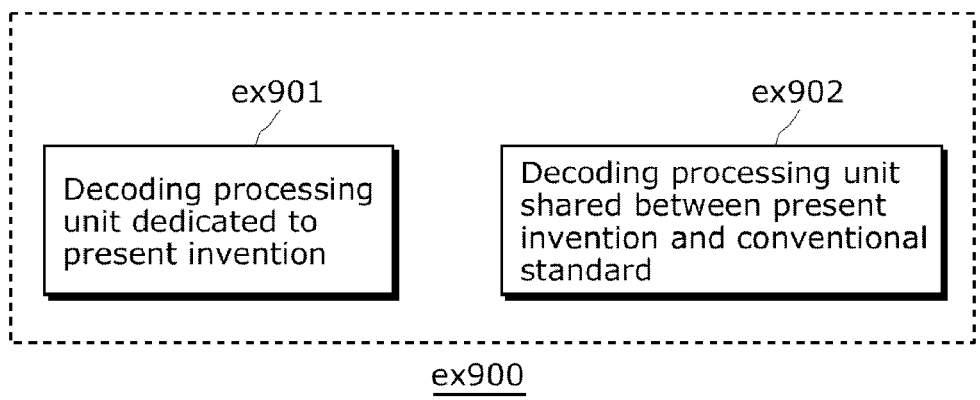
FIG. 34B
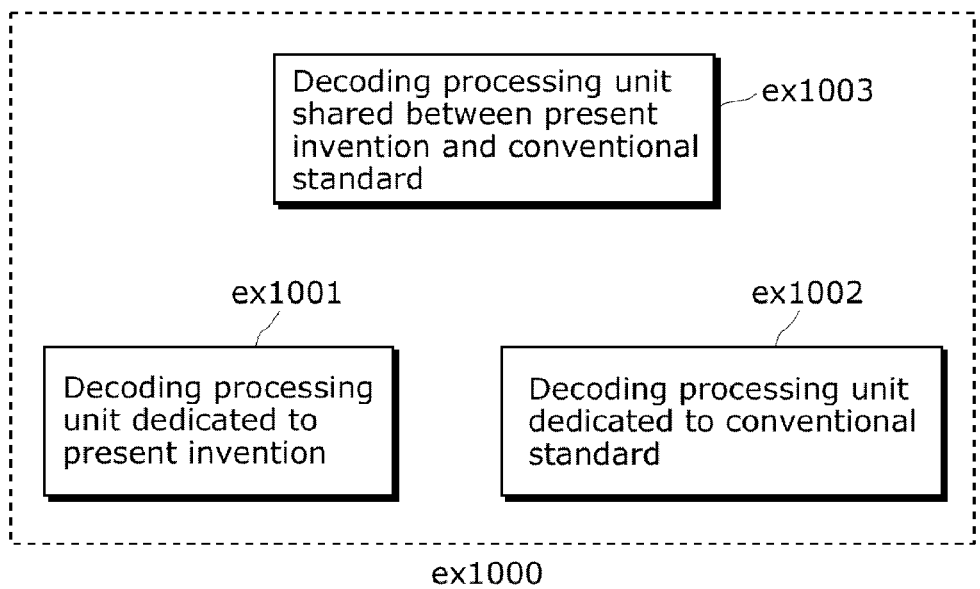

IMAGE CODING METHOD, IMAGE DECODING METHOD, IMAGE CODING APPARATUS, IMAGE DECODING APPARATUS, AND IMAGE CODING AND DECODING APPARATUS

CROSS REFERENCE TO RELATED APPLICATIONS

The present application claims the benefit of U.S. Provisional Patent Application No. 61/445,258 filed Feb. 22, 2011 and U.S. Provisional Patent Application No. 61/509,167 filed Jul. 19, 2011. The entire disclosures of the above-identified applications, including the specifications, drawings and claims are incorporated herein by reference in their entirety.

TECHNICAL FIELD

The present disclosure relates to image coding methods of coding images to generate a coded stream, and image decoding methods of decoding images included in the coded stream.

BACKGROUND ART

In the H.264 standard (see Non-Patent Literature 1), image (including video) coding typically comprises intra coding using spatial prediction methods, and inter coding using temporal prediction methods.

Temporal prediction may be performed for a number of different inter-coding block types, such as Inter 16×16, Inter 16×8, Inter 8×16, inter 8×8, inter 8×4, inter 4×8 and Inter 4×4, while spatial prediction may be performed for a number of intra-coding block types, such as Intra 16×16, Intra 8×8 and Intra 4×4. Intra Pulse Code Modulation (IPCM) blocks are one kind of intra coding blocks.

IPCM blocks are blocks of uncompressed image samples where raw luma and chroma samples are signaled in the coded stream. They are typically used in the case when the entropy coder produces more bits compared to raw data bits when coding a block of image samples. In general, IPCM blocks are coded as uncompressed data in the coded stream.

CITATION LIST

Non Patent Literature

[NPL 1] ITU-T H.264 03/2010

SUMMARY OF INVENTION

Technical Problem

However, there is a situation where IPCM blocks prohibit improvement of coding efficiency. A data amount of an IPCM block depends on a size of luma and chroma bit-depth. As a bit-depth is greater, a data amount of an uncompressed IPCM block is larger. Therefore, in the above situation, IPCM blocks prohibit improvement of coding efficiency.

In order to address the above, one non-limiting and exemplary embodiment provides an image coding method and an image decoding method by which coding efficiency can be improved by using an adaptive bit-depth.

Solution to Problem

In one general aspect of the present disclosure for solving the above problem, there is provided an image coding method of coding images to generate a coded stream, the image coding method including: writing a first parameter into a sequence parameter set in the coded stream to be generated, the first parameter representing a first bit-depth that is a bit-depth of a reconstructed sample in the images; and writing a second parameter different from the first parameter into the sequence parameter set, the second parameter representing a second bit-depth that is a bit-depth of an Intra Pulse Code Modulation (IPCM) sample in the images.

Thereby, it is possible to set the bit-depth for IPCM samples separately and independently from the bit-depth for reconstructed samples. Therefore, redundant data of the IPCM samples can be reduced. As a result, coding efficiency can be improved.

Furthermore, the image coding method may include writing the IPCM sample into the coded stream at the second bit-depth.

Thereby, IPCM samples are written into the coded stream at the bit-depth set for IPCM samples which is different from the bit-depth set for reconstructed samples. As a result, coding efficiency can be improved.

Still further, the image coding method may further include reconstructing a sample at the first bit-depth from a coded sample in the images, so as to generate the reconstructed sample.

Thereby, reconstructed samples are generated at the bit-depth set for reconstructed samples which is different from the bit-depth set for IPCM samples. As a result, image quality can be improved.

Still further, in the writing of the second parameter, the second parameter representing the second bit-depth that may be equal to or smaller than the first bit-depth is written.

Thereby, the bit-depth for IPCM samples is set to be equal to or smaller than the bit-depth for reconstructed samples. Therefore, redundant data of the IPCM samples can be reduced.

Still further, the image coding method may further include converting the IPCM sample at the second bit-depth into the reconstructed sample at the first bit-depth.

Thereby, even if the bit-depth for IPCM samples is different from the bit-depth for reconstructed samples, IPCM samples can be used as reconstructed samples.

Still further, in the writing of the second parameter, the second parameter representing the second bit-depth that may be smaller than a third bit-depth is written, the third bit-depth being a bit-depth of an original sample in the images, and the image coding method may further include converting the original sample at the third bit-depth into a sample at the second bit-depth, so as to decrease the bit-depth of the IPCM sample corresponding to the original sample.

Thereby, it is possible to reduce redundant data of IPCM samples corresponding to original samples. As a result, coding efficiency can be improved.

Still further, in the writing of the first parameter, the first parameter representing the first bit-depth that may be larger than a third bit-depth is written, the third bit-depth being a bit-depth of an original sample in the images, and the image coding method may further include converting the original sample at the third bit-depth into a sample at the first bit-depth, so as to increase the bit-depth of the reconstructed sample corresponding to the original sample.

Thereby, it is possible to increase the bit-depth of reconstructed samples corresponding to original samples. As a result, image quality can be improved.

Still further, the image coding method may further include writing a coded sample coded using the reconstructed sample at the first bit-depth into the coded stream.

Thereby, coded samples coded using reconstructed samples at the bit-depth for reconstructed samples are written to the coded stream.

In another aspect of the present disclosure, there is provided an image decoding method of decoding images in a coded stream, the image decoding method including: obtaining a first parameter from a sequence parameter set in the coded stream, the first parameter representing a first bit-depth that is a bit-depth of a reconstructed sample in the images; and obtaining a second parameter different from the first parameter from the sequence parameter set, the second parameter representing a second bit-depth that is a bit-depth of an Intra Pulse Code Modulation (IPCM) sample in the images.

Thereby, it is possible to set the bit-depth for IPCM samples separately and independently from the bit-depth for reconstructed samples. Therefore, redundant data of the IPCM samples can be reduced. As a result, coding efficiency can be improved.

Furthermore, the image decoding method may further include obtaining the IPCM sample from the coded stream at the second bit-depth.

Thereby, IPCM samples are obtained from the coded stream at the bit-depth set for IPCM samples which is different from the bit-depth set for reconstructed samples. As a result, coding efficiency can be improved.

Still further, the image decoding method may further include reconstructing a sample at the first bit-depth from a coded sample in the images, so as to generate the reconstructed sample.

Thereby, reconstructed samples are generated at the bit-depth set for reconstructed samples which is different from the bit-depth set for IPCM samples. As a result, image quality can be improved.

Still further, in the obtaining of the second parameter, the second parameter representing the second bit-depth that may be equal to or smaller than the first bit-depth is obtained.

Thereby, the bit-depth for IPCM samples is set to be equal or smaller than the bit-depth for reconstructed samples. Therefore, redundant data of the IPCM samples can be reduced.

Still further, the image decoding method may further include converting the IPCM sample at the second bit-depth to the reconstructed sample at the first bit-depth.

Thereby, even if the bit-depth for IPCM samples is different from the bit-depth for reconstructed samples, IPCM samples can be used as reconstructed samples.

Still further, in the obtaining of the second parameter, the second parameter representing the second bit-depth that may be smaller than the first bit-depth is obtained, and the image decoding method may further include converting the IPCM sample at the second bit-depth into a sample at the first bit-depth, so as to increase the bit-depth of the IPCM sample.

Thereby, even if the bit-depth for IPCM samples is different from the bit-depth for reconstructed samples, IPCM samples can be used as reconstructed samples.

Still further, in the obtaining of the second parameter, the second parameter representing the second bit-depth that may be smaller than a third bit-depth is obtained, the third bit-depth being a bit-depth of an original sample in the images.

Thereby, it is possible to appropriately obtain IPCM samples from which redundant data is reduced. As a result, coding efficiency can be improved.

Still further, in the obtaining of the first parameter, the first parameter representing the first bit-depth that may be larger than a third bit-depth is obtained, the third bit-depth being a bit-depth of an original sample in the images.

Thereby, it is possible to increase the bit-depth of reconstructed samples. As a result, image quality can be improved.

Still further, the image decoding method may further include obtaining a coded sample to be decoded using the reconstructed sample at the first bit-depth from the coded stream.

Thereby, it is possible to decode coded samples obtained from the coded stream, by using reconstructed samples at the bit-depth for reconstructed samples.

In still another aspect of the present disclosure, there is provided an image coding apparatus that codes images to generate a coded stream, the image coding apparatus including: a first writing unit configured to write a first parameter into a sequence parameter set in the coded stream to be generated, the first parameter representing a first bit-depth that is a bit-depth of a reconstructed sample in the images; and a second writing unit configured to write a second parameter different from the first parameter into the sequence parameter set, the second parameter representing a second bit-depth that is a bit-depth of an Intra Pulse Code Modulation (IPCM) sample in the images.

Thereby, the image coding method is implemented as the image coding apparatus.

In still another aspect of the present disclosure, there is provided an image decoding apparatus that decodes images in a coded stream, the image decoding apparatus including: a first obtaining unit configured to obtain a first parameter from a sequence parameter set in the coded stream, the first parameter representing a first bit-depth that is a bit-depth of a reconstructed sample in the images; and a second obtaining unit configured to obtain a second parameter different from the first parameter from the sequence parameter set, the second parameter representing a second bit-depth that is a bit-depth of an Intra Pulse Code Modulation (IPCM) sample in the images.

Thereby, the image decoding method is implemented as the image decoding apparatus.

In still another aspect of the present disclosure, there is provided an image coding and decoding apparatus including an image coding unit configured to code images to generate a coded stream, wherein the image coding unit includes: a first writing unit configured to write a first parameter into a sequence parameter set in the coded stream to be generated, the first parameter representing a first bit-depth that is a bit-depth of a reconstructed sample in the images; and a second writing unit configured to write a second parameter different from the first parameter into the sequence parameter set, the second parameter representing a second bit-depth that is a bit-depth of an Intra Pulse Code Modulation (IPCM) sample in the images, and the image coding and decoding apparatus further including an image decoding unit configured to decode images in a coded stream, wherein the image decoding unit includes: a first obtaining unit configured to obtain a first parameter from a sequence parameter set in the coded stream, the first parameter representing a first bit-depth that is a bit-depth of a reconstructed sample in the images; and a second obtaining unit configured to obtain a second parameter different from the first parameter from the sequence parameter set, the second parameter representing a second bit-depth that is a bit-depth of an IPCM sample in the images.

Thereby, the image coding apparatus and the image decoding apparatus are implemented as the image coding and decoding apparatus.

Advantageous Effects of Invention

According to the present disclosure, it is possible to set a bit-depth for IPCM samples separately and independently from a bit-depth for reconstructed samples. Therefore, redundant data of the IPCM samples can be reduced. As a result, coding efficiency can be improved.

BRIEF DESCRIPTION OF DRAWINGS

These and other objects, advantages and features of the present disclosure will become apparent from the following description thereof taken in conjunction with the accompanying drawings that illustrate a specific embodiment of the present disclosure. In the Drawings:

FIG. 4 is a syntax diagram which shows of 8-bit-depth conversion according to Embodiment 1;

FIG. 22 illustrates a structure of multiplexed data;

FIG. 33 shows an example of a look-up table in which video data standards are associated with driving frequencies;

FIG. 34A is a diagram showing an example of a configuration for sharing a module of a signal processing unit; and FIG. 34B is a diagram showing another example of a configuration for sharing a module of the signal processing unit.

DETAILED DESCRIPTION

The following describes embodiments according to the present disclosure in detail with reference to the drawings. It should be noted that all the embodiments described below are specific examples of the present disclosure. Numerical values, shapes, materials, constituent elements, arrangement positions and the connection configuration of the constituent elements, steps, the order of the steps, and the like described in the following embodiments are merely examples, and are not intended to limit the present disclosure. The present disclosure is characterized by the appended claims. Therefore, among the constituent elements in the following embodiments, constituent elements that are not described in independent claims that show the most generic concept of the present disclosure are described as elements constituting more desirable configurations, although such constituent elements are not necessarily required to achieve the object of the present disclosure.

(Introduction)

High Efficiency Video Coding (HEVC) can support bit-depth increase in image decoding. This means that even if the source image is an 8-bit bit-depth image source, a HEVC decoder can support the decoding of the coded image as a 10 bits bit-depth image to improve the coding efficiency. To reduce the memory bandwidth requirement for inter prediction, when decoding a 10 bits bit-depth image, a light compression scheme can be used to compress a block of 10 bits bit-depth image samples for faster memory access.

Currently, there are ways to signal the bit-depths of a reconstructed image to the decoder through the coded image bit stream. In H.264, the syntax elements (bit_depth_luma_minus8 and bit_depth_chroma_minus8) in the sequence parameter set specify the bit-depths of reconstructed luma and chroma data respectively for a plurality of profiles such as High profile, High 10 profile and High 4:2:2 profile. For yet other plurality of profiles in H.264, the syntax elements (bit_depth_luma_minus8 and bit_depth_chroma_minus8) are not present in the coded image bit stream, and the bit-depths of reconstructed image data is inferred to be equal to 8.

However, one problem is that the signaled bit-depth can be greater than the original image bit-depth before coding process, by increase of the bit-depth. For an IPCM block, coding the raw luma and chroma samples at a bit-depth larger than the original image samples is inefficient and reduces coding efficiency.

If the bit-depth of the reconstructed images is greater than the bit-depth of the original images, a light compression scheme may be used to reduce memory bandwidth. However, an IPCM block containing the original image samples cannot be stored directly into the memory at a lower bit-depth as there is a problem differentiating an IPCM reconstructed block and a lightly compressed block in memory. This typically results in error in the inter prediction if a wrong decompression scheme is used for the IPCM constructed image block.

Figure 1:
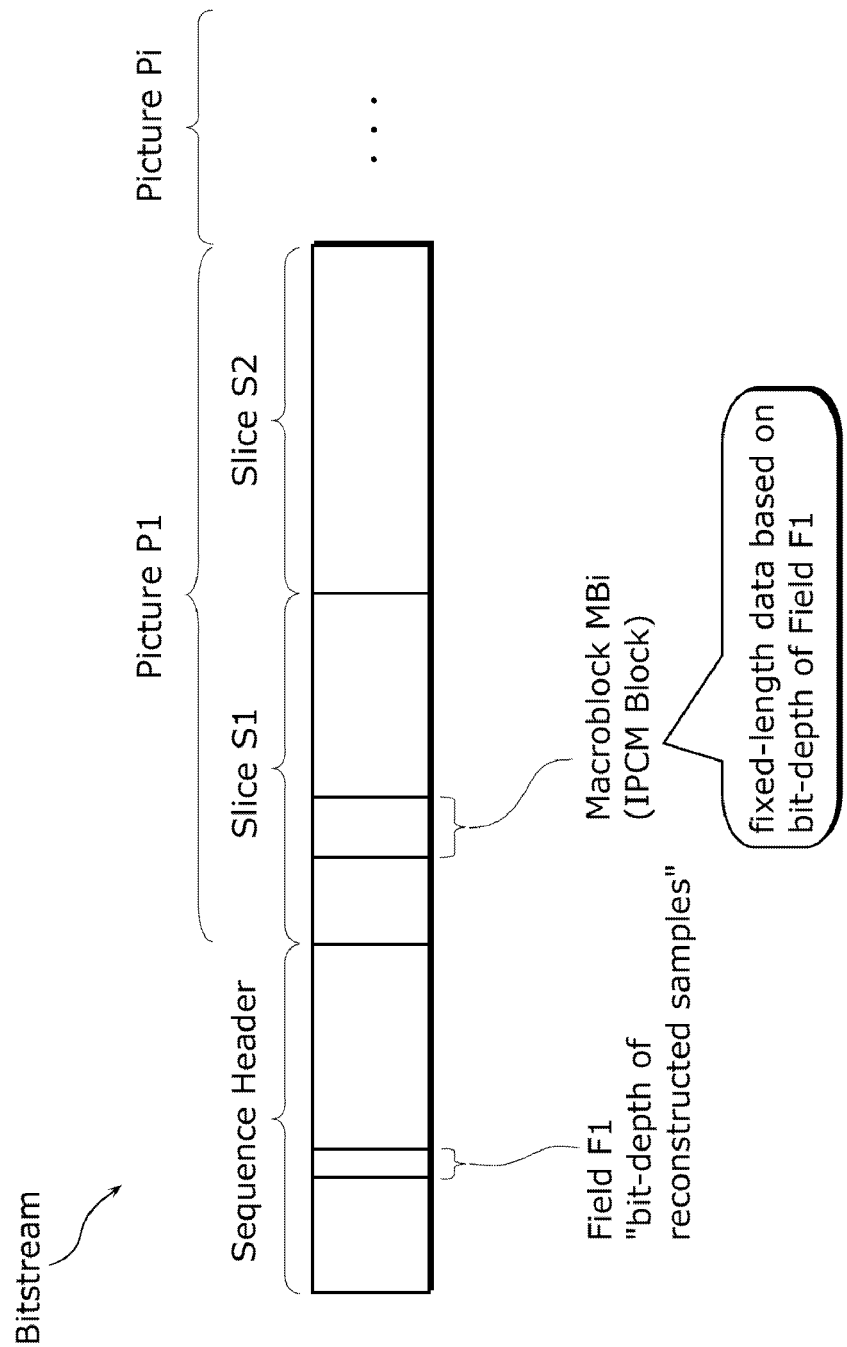
FIG. 1 is a syntax diagram which shows the location of a field parameter in a coded stream.

FIG. 1 is a syntax diagram which shows the location of a field parameter in a coded stream. As shown in FIG. 1, if a field 1 of a parameter indicating "reconstructed samples bit-depth" is present, it is stored in a header of sequence of a bitstream. A bitstream comprises a series of pictures, such as a picture P1 . . . , a picture Pi . . . , wherein each picture comprises a series of slices. Here, the picture P1 comprises a slice S1 and a slice S2, wherein a macroblock MBi of the slice S1 is an IPCM block.

In FIG. 1, header information is stored in the header of sequence of the bitstream, wherein the header information comprises the field F1 of a parameter indicating reconstructed samples bit-depth. In the scenario of FIG. 1, whether or not the macroblock MBi is an IPCM block, the field F1 of the fixed length parameter indicating a bit-depth is used for reconstruction purpose (in decoder or encoder).

Figure 2:
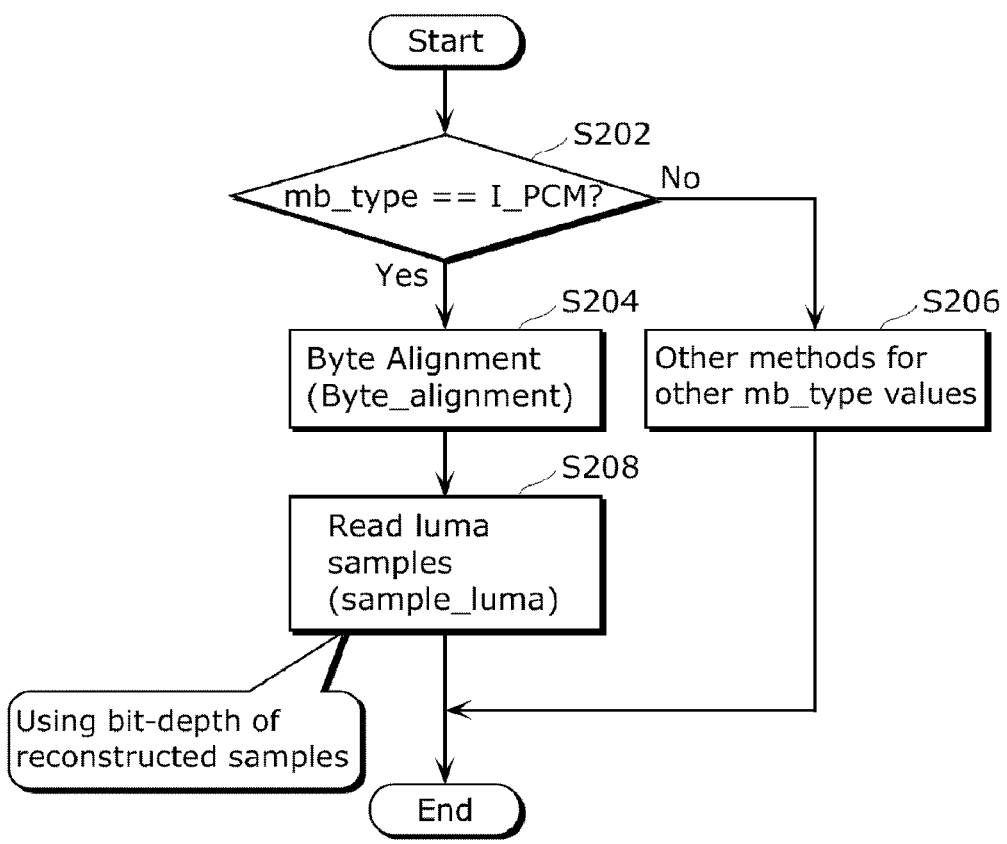
FIG. 2 is a flowchart which shows a sequence of operations of an image decoding method H.264, Section 7.3.5.

FIG. 2 is a flowchart which shows a sequence of operations of an image decoding method H.264, Section 7.3.5.

A control unit determines whether or not a macroblock type (mb_type) is I_PCM (IPCM block) (Step S202). Here, in the case where the control unit determines that the macroblock type is not I_PCM (No in Step S202), the macroblock is processed using other methods for other mb_type values (Step S206).

On the other hand, in the case where the control unit determines the mb_type is I_PCM (Yes in Step S202), a byte alignment operation (byte_alignment) is executed on the IPCM macroblock (Step S204). Next, the luma sample values (sample_luma) (for example, 8 bits) of total number of samples [0 . . . Num_of_samples] are read (Step S208). In H.264, ONLY one parsing method is available for I_PCM block of size 16×16 (macroblock size).

Thus, there exists a need for a method and apparatus for coding and decoding images using appropriate bit-depth information. The embodiments described below offer techniques by which coding efficiency can be improved by using an adaptive bit-depth.

It should be noted that an IPCM block is a block including IPCM samples. It should also be noted that a IPCM block is treated as one kind of a prediction unit in HEVC. Therefore, an IPCM block is sometimes called an IPCM prediction unit block or an IPCM PU block.

Embodiment 1

Figure 3:
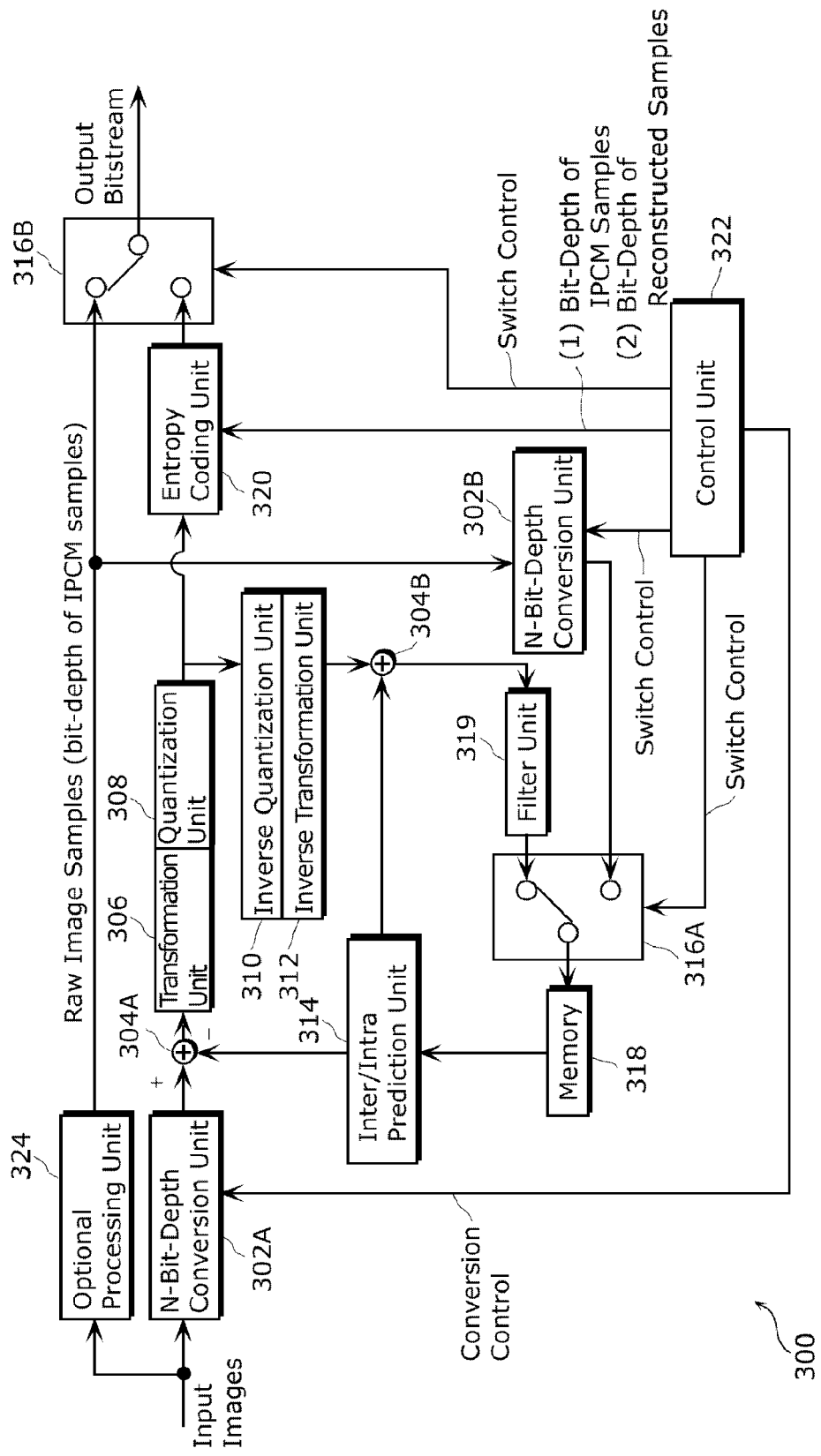
FIG. 3 is a block diagram which shows a structure of an image coding apparatus according to Embodiment 1 of the present disclosure.

FIG. 3 is a block diagram which shows a structure of an image coding apparatus according to Embodiment 1 of the present disclosure. The image coding apparatus 300 shown in FIG. 3 is an apparatus for coding an input image bit stream on a block-by-block basis so as to generate a coded output bitstream.

As shown in FIG. 3, the image coding apparatus 300 includes two N-bit-depth conversion units 302A and 302B, a subtractor 304A and an adder 304B, a transformation unit 306, a quantization unit 308, an inverse quantization unit 310, an inverse transformation unit 312, an inter/intra prediction unit 314, two multiplexers (MUX units) 316A and 316B, a memory 318, a filter unit 319, an entropy coding unit 320, a control unit 322, and an optional processing unit 324.

Input images are inputted to the N-bit-depth conversion unit 302A and the optional processing unit 324. After the input image bit stream is inputted to the N-bit-depth conversion unit 302A, the N-bit-depth conversion unit 302A invokes an N-bit-depth conversion on the input images in accordance with a notification determined by the control unit 322, and outputs the resulting N-bit-depth converted values to the subtractor 304A.

A subtractor 304A subtracts, from the N-bit-depth values outputted from the N-bit-depth conversion unit 302A, the predicted image values outputted from the inter/intra prediction unit 314, and outputs the resulting values to the transformation unit 306. The transformation unit 306 transforms the resulting values into frequency coefficients, and outputs the resulting frequency coefficients to the quantization unit 308. The quantization unit 308 quantizes the inputted frequency coefficients, and outputs the resulting quantized values to the inverse quantization unit 310 and the entropy coding unit 320.

The entropy coding unit 320 encodes the quantized values outputted from the quantization unit 308 in accordance with the notification determined by the control unit 322, and outputs the resulting values to the multiplexer 316B. Here, the entropy coding unit 320 may perform variable length coding on parameters and the like.

The inverse quantization unit 310 inversely quantizes the quantized valued outputted from the quantization unit 308, and outputs the resulting inversely-quantized values to the inverse transformation unit 312. The inverse transformation unit 312 performs inverse frequency transform on the frequency coefficients so as to transform the frequency coefficients into sample values of the bit stream, and outputs the resulting sample values to the adder 304B. The adder 304B adds the sample values outputted from the inverse transformation unit 312 to the predicted image values outputted from the inter/intra prediction unit 314, and outputs the resulting added values to the multiplexer 316A through the filter unit 319.

The filter unit 319 performs filtering, such as deblocking filtering for removing block distortion, on the resulting added values, as necessary.

The multiplexer 316A selects values from either the values outputted from the filter unit 319 or the values outputted from the N-bit-depth conversion unit 302B in accordance with the notification determined by the control unit 322, and outputs the resulting values to the memory 318 for further prediction. The inter/intra prediction unit 314 searches within reconstructed images stored in the memory 318, and estimates an image area which is e.g. most similar to the input image for prediction.

Furthermore, the input images are inputted to the optional processing unit 324. The optional processing unit 324 manipulates image bit streams such as sharpening, smoothing as well as deblocking bit streams, selects raw fixed-length image samples (in a bit-depth of IPCM samples), and outputs the resulting selected value to the N-bit-depth conversion unit 302B. The N-bit-depth conversion unit 302B invokes an N-bit-depth conversion on the raw image samples and outputs the resulting values to the multiplexer 316A in accordance with the notification determined by the control unit 322. The optional processing unit 324 also outputs the resulting value to the multiplexer 316B.

It should be noted that the optional processing unit 324, as described above, selects the raw fixed-length image samples at a bit-depth of IPCM samples. More specifically, the optional processing unit 324 adjusts the bit-depth of the input images to the bit-depth for IPCM. For example, the optional processing unit 324 decreases the bit-depth of the input images to the bit-depth for IPCM.

The multiplexer 316B can select values from the values outputted from the entropy coding unit 320, or the values outputted from the optional processing unit 324, and output resulting values in accordance with the notification determined by the control unit 322. The output bitstream of the multiplexer 316B is the coded bitstream and is shown later in the syntax diagram in FIG. 6.

The control unit 322 determines a notification for notifying the N-bit-depth conversion units 302A and 302B whether or not to invoke N-bit-depth conversion on the input images. The control unit 322 also determines a notification for notifying the multiplexer 316A to select values either outputted from the filter unit 319 or outputted from the N-bit-depth conversion unit 320B. Likewise, the control unit 322 also determines a notification for notifying the multiplexer 316B to select values either outputted from the optional processing unit 324 or outputted from the entropy coding unit 320.

For example, the control unit 322 can use a predetermined scheme, i.e. comparing the number of coded bits produced by the entropy coding unit 320 with the number of bits of raw fixed-length samples from the optional processing unit 324. If coded bits are fewer than bits of raw fixed-length samples, the control unit 322 notifies the multiplexer 316B to select values outputted from the entropy coding unit 320; otherwise, the control unit 322 notifies the multiplexer 316B to select values outputted from the optional processing unit 324.

The control unit 322 further outputs two parameters (1) a bit-depth of IPCM samples and (2) a bit-depth of reconstructed samples to the entropy coding unit 320 which writes the two parameters into the output bitstream.

As described above, the N-bit-depth conversion is converting original M-bit data to N-bit data by e.g. inserting padding into the original M-bit data and extending M-bit data to N-bit data or compressing the original M-bit data into N-bit data.

If M=N, then each of the N-bit-depth conversion units 302A and 302B directly outputs M-bit data as the N-bit-depth conversion resulting values. In case that the bits of the input data M>N, then each of the N-bit-depth conversion units 302A and 302B may compress M-bit data into N-bit data and outputs compressed N-bit data. Otherwise, if the bits of the input data M<N, then each of the N-bit-depth conversion units 302A and 302B may insert padding, for example, [0, 0 . . . 0] or [1, 0 . . . 0] (in total (M–N) bits) in the beginning of the original M-bit data or at the end of the original M-bit data or between the original M-bit data, and outputs the padded N-bit data.

FIG. 4 is a syntax diagram which shows of 8-bit-depth conversion according to Embodiment 1.

In FIG. 4 (a), both a bit-depth for luma component of the reconstructed images (402) and a bit-depth for chroma component of the reconstructed images (404) are 8 bits. On the other hand, both a bit-depth for luma component of original IPCM blocks (406) and a bit-depth for chroma component of original IPCM blocks (408) are 8 bits. Thus, the bit-depths of the reconstructed images (8 bits) for both luma component and chroma component are equal to the bit-depths of original IPCM blocks (8 bits) for both luma component and chroma component. As a result, neither bit-increase nor bit-decrease is needed for 8-bit-depth conversion.

In FIG. 4 (b), both a bit-depth for luma component of the reconstructed images (410) and a bit-depth for chroma component of the reconstructed images (412) are 8 bits. On the other hand, both a bit-depth for luma component of original IPCM blocks (414) and a bit-depth for chroma component of original IPCM blocks (416) are 10 bits. Thus, the bit-depths of the reconstructed image (8 bits) for both luma component and chroma component are smaller than the bit-depths of original IPCM blocks (10 bits) for both luma component and chroma component. The IPCM blocks undergo a decrease in bit-depth to the level equal to the bit-depth of the reconstructed images by means of, for example, compressing 10-bit data into 8-bit data.

In FIG. 4 (c), both a bit-depth for luma component of the reconstructed images (418) and a bit-depth for chroma component of the reconstructed images (420) are 10 bits. On the other hand, both a bit-depth for luma component of original IPCM blocks (422) and a bit-depth for chroma component of original IPCM blocks (424) are 8 bits. Thus, the bit-depths of the reconstructed image (10 bits) for both luma component and chroma component are greater than the bit-depths of original IPCM blocks (8 bits) for both luma component and chroma component. The IPCM blocks undergo an increase in bit-depth to the level equal to the bit-depth of the reconstructed images by means of, for example, inserting 2-bit padding into the IPCM blocks.

Next, a description is given as to the operations of the image coding apparatus 300 as mentioned above.

Figure 5:
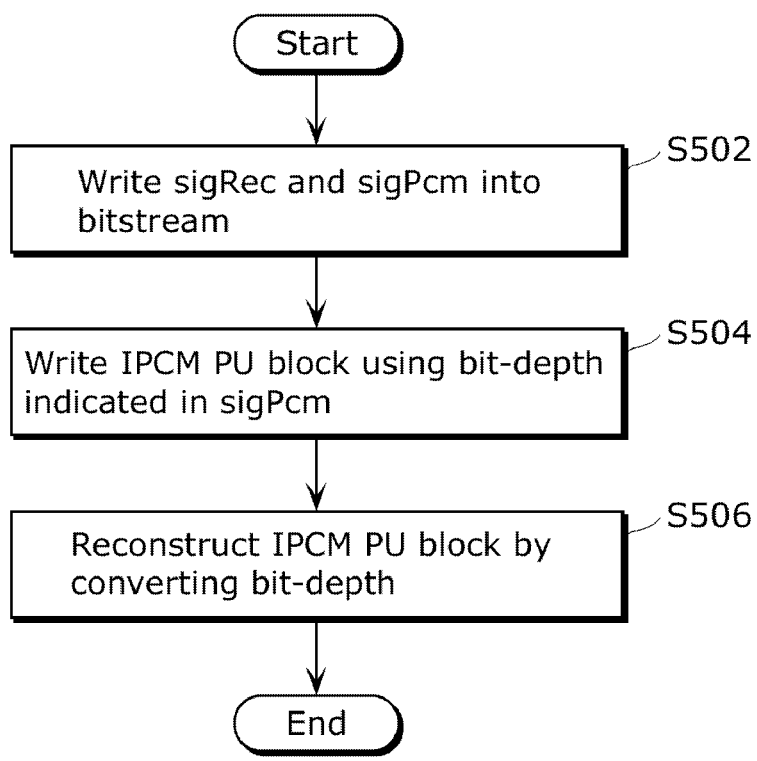
FIG. 5 is a flowchart which shows a sequence of operations performed by an image coding apparatus according to Embodiment 1.

FIG. 5 is a flowchart which shows a sequence of operations performed by the image coding apparatus 300 according to Embodiment 1.

At Step S502, a signal (parameter) sigRec indicating a bit-depth of reconstructed samples and a signal (parameter) SigPcm indicating a bit-depth of IPCM samples are written into the header of image (video) stream. At Step S504, IPCM PU block is written using the bit-depth indicated in the signal sigPcm, e.g. 10 bits. Then, the IPCM PU block is reconstructed by converting the bit-depth indicated in the signal sigPcm to the bit-depth indicated in the signal sigRec, e.g. from 10 bits to 8 bits (Step S506).

Figure 6:
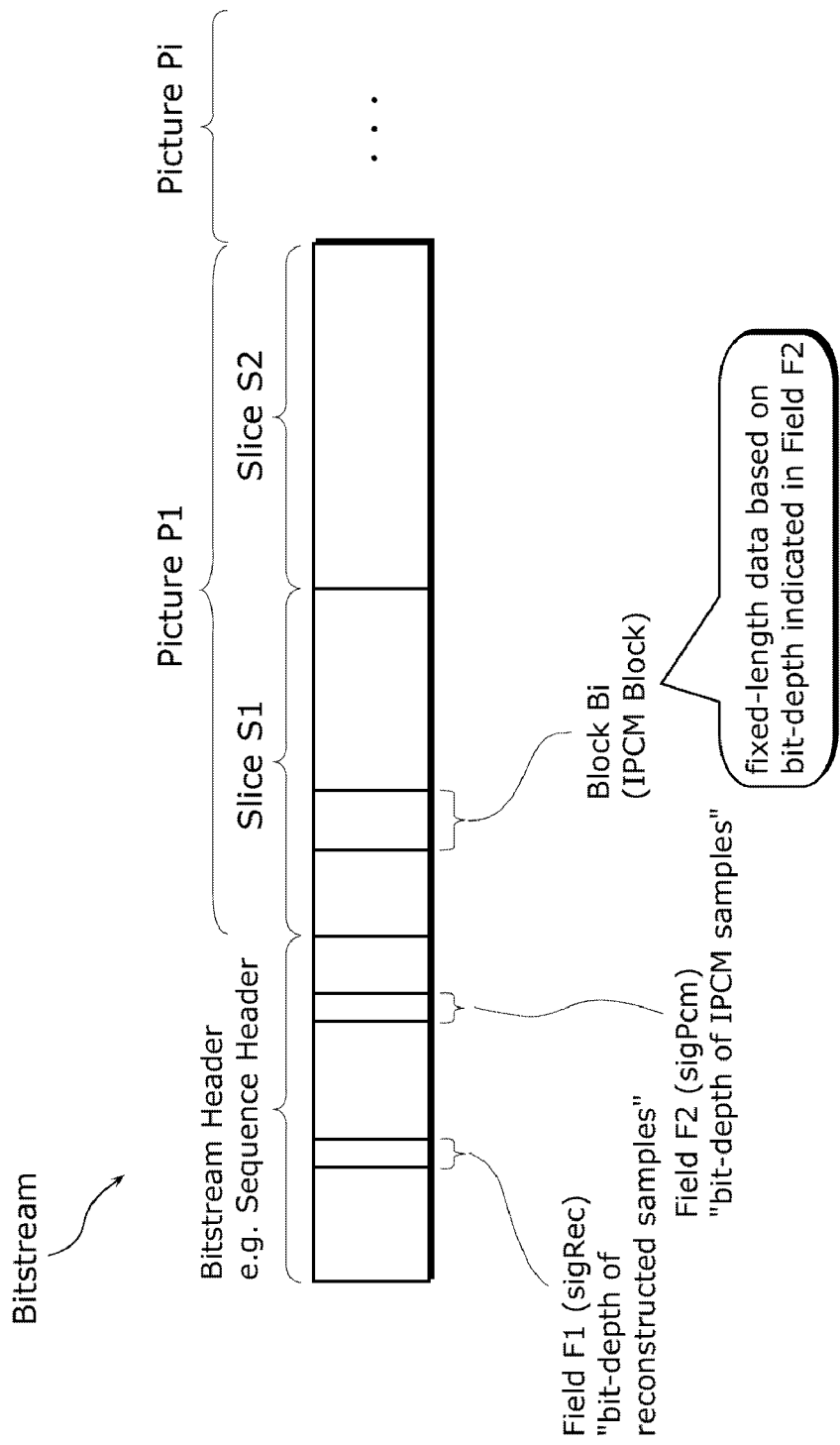
FIG. 6 is a syntax diagram which shows two field parameters in a coded stream according to Embodiment 1.

FIG. 6 is a syntax diagram which shows two field parameters in a coded stream according to Embodiment 1.

As shown in FIG. 6, if a filed 1 for a parameter indicating "bit-depth of reconstructed samples" (e.g. denoted as bit_depth_luma_minus8 and bit_depth_chroma_minus8 shown in FIG. 4) and a filed F2 for a parameter indicating "bit-depth of IPCM samples" (e.g. denoted as pcm_bit_depth_luma_minus1 and pcm_bit_depth_chroma_minus1 shown in FIG. 4), are present, they are stored in a header of sequence of a series of pictures. In FIG. 6, a coded bitstream comprises a series of pictures, such as a picture P1 . . . , a picture Pi . . . , wherein each picture comprises a series of slices. Here, the picture P1 comprises a slice S1 and a slice S2, wherein a block Bi of the slice S1 is an IPCM block.

In FIG. 6, header information includes parameters such as a sequence header (sequence parameter set), a picture header (picture parameter set), a slice header, SEI (supplemental enhancement information), NAL (network abstraction layer) etc.

The header information is stored in the header of image stream, wherein the sequence header comprises the field F1 for the parameter indicating 8-bit "bit-depth of reconstructed samples" (SigRec) and the field F2 for the parameter indicating 10-bit "bit-depth of IPCM samples" (SigPcm). In FIG. 6, the block Bi is an IPCM block, so bit-depth parameter in the field F2 (sigPcm) is used for block Bi reconstruction rather than the bit-depth parameter in the field F1 (sigRec).

The effect of the present embodiment is coding efficiency improvement of IPCM data in a coded image bitstream. Using the present embodiment, IPCM data is coded at its uncompressed bit-depths, which may differ from the bit-depths of the reconstructed image samples. When the bit-depth of uncompressed samples is smaller than that of the reconstructed samples, the present embodiment removes the redundancy in coding the excess bits. On the other hand, when the bit-depth of the uncompressed samples is larger than that of the reconstructed samples, the present embodiment provides a structure for faithfully keeping the uncompressed bit-depth in IPCM data without losing bit precision.

Embodiment 2

Figure 7:
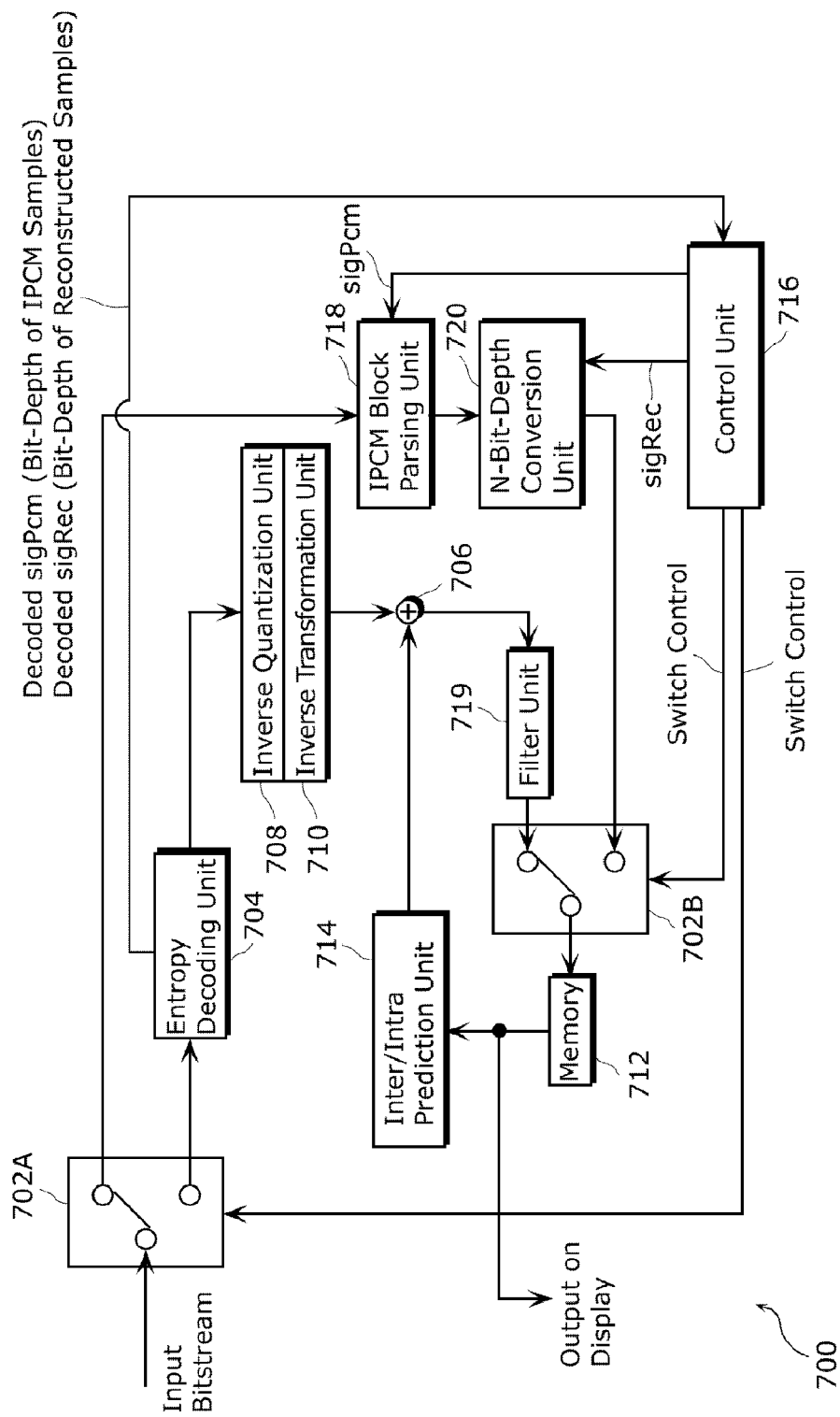
FIG. 7 is a block diagram which shows a structure of an image decoding apparatus according to Embodiment 2 of the present disclosure.

FIG. 7 is a block diagram which shows a structure of an image decoding apparatus according to Embodiment 2 of the present disclosure. The image decoding apparatus 700 shown in FIG. 7 is an apparatus for decoding an input coded bitstream on a block-by-block basis and outputting images.

The image decoding apparatus 700 includes as shown in FIG. 7, a demultiplexer (DEMUX unit) 702A, a multiplexer (MUX unit) 702B, an entropy decoding unit 704, an adder 706, an inverse quantization unit 708, an inverse transformation unit 710, a memory 712, an intra/inter prediction unit 714, a control unit 716, a IPCM block parsing unit 718, a filter unit 719, and an N-bit-depth conversion unit 720.

An input coded bitstream is inputted to the demultiplexer 702A, and the demultiplexer 702A outputs the resulting values whether to the entropy decoding unit 704 or the IPCM block parsing unit 718 in accordance with a notification determined by the control unit 716.

After the input coded bitstream is inputted to the entropy decoding unit 704, the entropy decoding unit 704 decodes the values outputted from demultiplexer 702A, and outputs the decoded values to the inverse quantization unit 708 and the control unit 716. Here, the entropy decoding unit 704 may perform variable length decoding on parameters and the like.

The inverse quantization unit 708 inversely quantizes the input values and outputs the resulting inversely-quantized values to the inverse transformation unit 710. The inverse transformation unit 710 performs inverse frequency transform on frequency coefficients to transform the frequency coefficients into sample values, and outputs the resulting pixel values to the adder 706. The adder 706 adds the sample values outputted from the inverse transformation unit 710 to the predicted image values outputted from the inter/intra prediction unit 714, and outputs the resulting values to the multiplexer 702B through the filter unit 719.

The filter unit 719 performs filtering such as deblocking filtering for removing block distortion, as necessary.

The multiplexer 702B selects values from either the values outputted from the filter unit 719 or the values outputted from N-bit-depth conversion unit 720 in accordance with the notification determined by the control unit 716, and outputs the resulting values to the memory 712 for further prediction. The decoded images are outputted to display from the memory 712. In addition, the inter/intra prediction unit 714 searches within images stored in the memory 712, and estimates an image area which is e.g. most similar to the decoded images for prediction.

Returning to the IPCM block parsing unit 718 and the N-bit-depth conversion unit 720, the parsing and converting processes rely on two parameters "bit-depth of IPCM samples (sigPcm)" and "bit-depth of reconstructed samples (sigRec)". The two parameters "bit-depth of IPCM samples (sigPcm)" and "bit-depth of reconstructed samples (sigRec)" are obtained from the entropy decoding unit 704 from the header of the input bitstream.

The input coded bitstream and the signal sigPcm (e.g. indicating 10 bits) outputted from the control unit 716 are inputted to the IPCM block parsing unit 718, and the IPCM block parsing unit 718 outputs the resulting parsed values to the N-bit-depth conversion unit 720. The N-bit-depth conversion unit 720 invokes an N-bit-depth conversion using the signal sigRec obtained from the control unit 716 and using the parsed value outputted from the IPCM block parsing unit 718, and outputs the resulting converted value to the multiplexer 702B.

The multiplexer 702B can select values from either the value outputted form the filter unit 719 or the values outputted from the N-bit-depth conversion unit 720 in accordance with the notification determined by the control unit 716.

The control unit 716 determines a notification for notifying the demultiplexer 702A to output whether to the entropy decoding unit 704 or to the IPCM block parsing unit 718. The control unit 716 also determines a notification for notifying the multiplexer 7028 to select values from either the value outputted from the filter unit 719 or the values outputted from the N-bit-depth conversion unit 720. In addition, the control unit 716 further provides with two signal sigPcm (e.g. 10 bits) and the signal sigRec (N bits) as input values to IPCM block parsing unit 718 and to the N-bit-depth conversion unit 720, respectively.

Next, a description is given as to the operations of the image decoding apparatus 700 as mentioned above.

Figure 8:
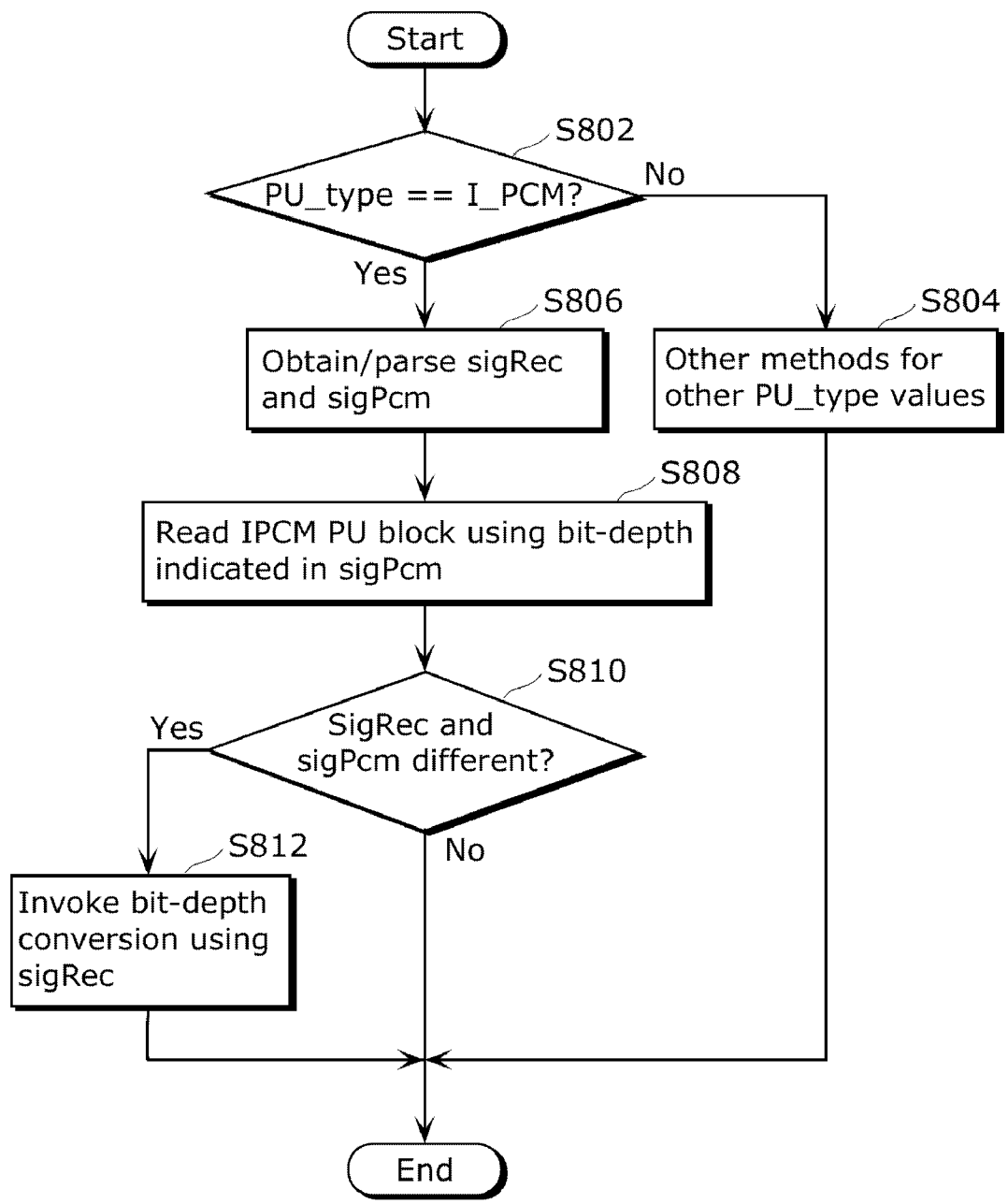
FIG. 8 is a flowchart which shows a sequence of operations performed by the image decoding apparatus according to Embodiment 2.

FIG. 8 is a flowchart which shows a sequence of operations performed by the image decoding apparatus 700 according to Embodiment 2.

At Step S802, a determination is made whether or not the PU_type (prediction unit type) is I_PCM. When the PU_type is not I_PCM, as a result of this determination (No in Step S802), the other methods for other PU_type values are used to decode the block (Step S804).

On the other hand, when the PU_type is I_PCM, as a result of this determination (Yes in Step S802), the control unit 716 obtains the signal sigRec and the signal sigPcm from the header of image stream (Step S806). Next, the I_PCM PU block are read using bit-depth of raw fixed-length samples indicated in the sigPcm, e.g. 10 bits (Step S808). Then, it is determined whether or not the bit-depth indicated in the signal sigRec and the bit-depth indicated in the signal sigPcm are different (Step S810). When the bit-depth indicated in the signal sigRec is different from the bit-depth indicated in the signal sigPcm (Yes in Step S810), an N-bit-depth conversion is invoked using the signal sigRec, e.g. from 10 bits to 8 bits (Step S812).

As described above, a parameter "bit-depth of IPCM samples" in a header of an image sequence can be used to identify the bit-depth of IPCM blocks so that a decoder knows how many bits per sample is required for the parsing of an IPCM block.

In the case that the bit-depth of the reconstructed images is greater (smaller) than the bit-depth of IPCM blocks and a light memory compression is used to compress the reconstructed images, the IPCM blocks would undergo an increase (decrease) in bit-depth to the level equal to the bit-depth of the reconstructed image and the same light compression scheme would be applied to the IPCM block as well to maintain consistency in the decompression process for inter prediction. When a light memory compression is used, IPCM samples are treated equally as non-IPCM samples due to the bit-depth conversion process.

The effect of the present embodiment is to enable the decoding of a coded video data which is coded in the form of coding efficiency improvement of IPCM data. When the bit-depth of uncompressed samples is smaller than that of the reconstructed samples, the present embodiment removes the redundancy in coding the excess bits. On the other hand, when the bit-depth of the uncompressed samples is larger than that of the reconstructed samples, the present embodiment provides a means for faithfully keeping the uncompressed bit-depth in IPCM data without losing bit precision.

Even if bit-depths of IPCM data and non-IPCM data are different, decoding can be appropriately by using the parameter in the coded video data which indicates a bit-depth of IPCM data.

Embodiment 3

In Embodiment 3, a description is given for characteristic operations performed by the image coding apparatus 300 described in Embodiment 1.

Figure 9:
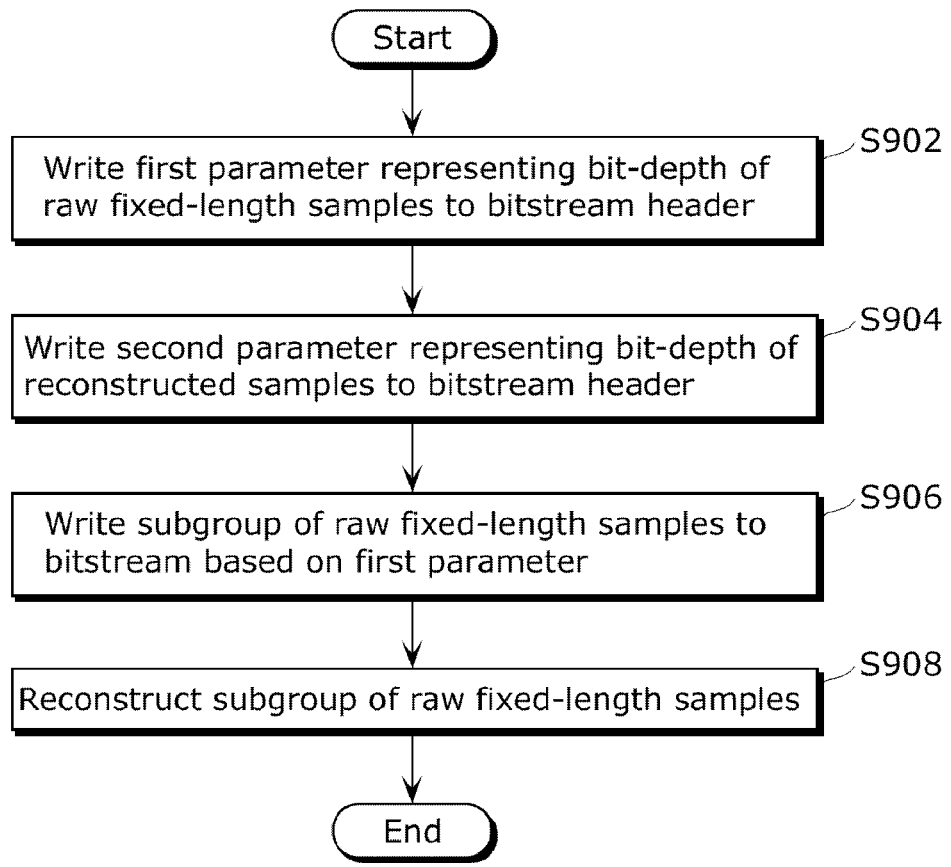
FIG. 9 is a flowchart which shows a coding method of coding an image bitstream according to Embodiment 3 of the present disclosure.

FIG. 9 is a flowchart which shows a coding method of coding an image bitstream according to Embodiment 3 of the present disclosure. At step S902, a first parameter representing a bit-depth of raw fixed-length samples signaled within the image bit stream is written into a header of the image (video) bit stream. At step S904, a second parameter representing a bit-depth of reconstructed samples from the image bit stream is written into the header of the image bit stream. At step S906, a subgroup of raw fixed-length samples is written at bits per sample into the image bit stream based on the first parameter. At Step S908, the subgroup of raw fixed-length samples is reconstructed, wherein the reconstructing includes converting the bit-depth of the subgroup of raw fixed-length samples from the first parameter to the second parameter.

Embodiment 4

The image coding apparatus according to Embodiment 4 includes the characteristic constituent elements in the image coding apparatus 300 described in Embodiment 1. Furthermore, the image decoding apparatus according to Embodiment 4 includes the characteristic constituent elements in the image decoding apparatus 700 described in Embodiment 2.

Figure 10A:
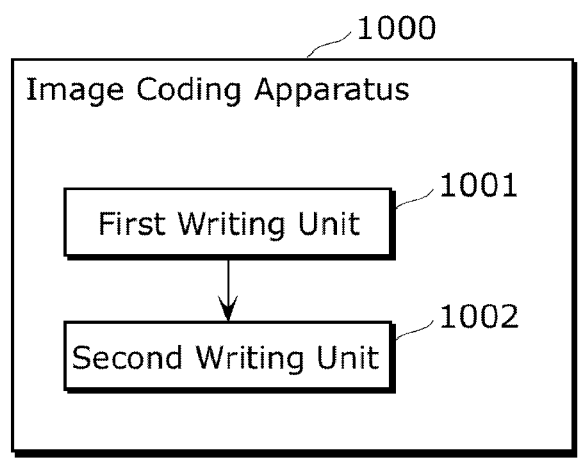
FIG. 10A is a block diagram which shows a structure of an image coding apparatus according to Embodiment 4 of the present disclosure.

FIG. 10A is a block diagram which shows a structure of the image coding apparatus according to Embodiment 4 of the present disclosure. The image coding apparatus 1000 shown in FIG. 10A codes images to generate a coded stream. Then, the image coding apparatus 1000 includes a first writing unit 1001 and a second writing unit 1002. The first writing unit 1001 and the second writing unit 1002 mainly corresponds to the entropy coding unit 320 according to Embodiment 1.

Figure 10B:
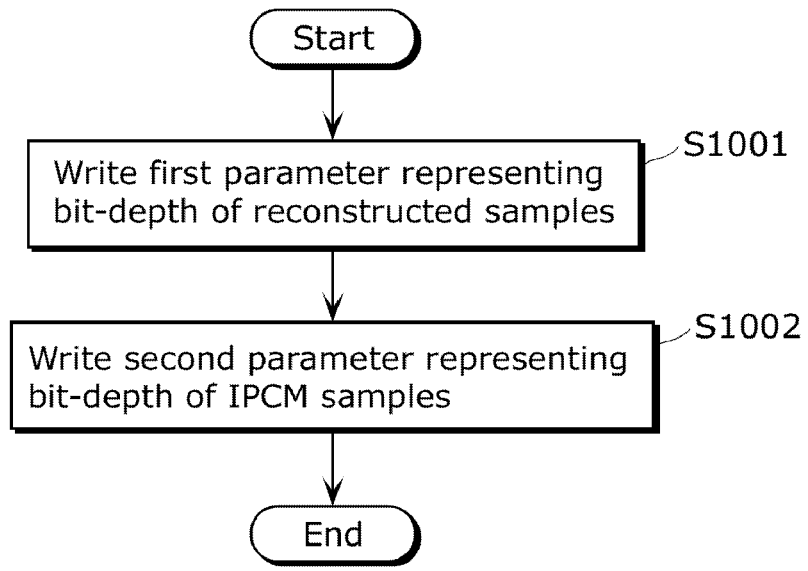
FIG. 10B is a flowchart which shows operations performed by an image coding apparatus according to Embodiment 4.

FIG. 10B is a flowchart which shows operations performed by the image coding apparatus 1000 shown in FIG. 10A.

As shown in FIG. 10B, the first writing unit 1001 writes the first parameter representing the first bit-depth that is a bit-depth of reconstructed samples of image, into a sequence parameter set in a coded stream to be generated (S1001). The second writing unit 1002 writes the second parameter, which represents the second bit-depth that is a bit-depth of IPCM samples in image and is different from the first parameter, into the sequence parameter set (S1002).

Thereby, it is possible to set a bit-depth of IPCM samples separately and independently from a bit-depth of reconstructed samples. Therefore, redundant data of IPCM samples can be reduced. As a result, coding efficiency can be improved.

Figure 11A:
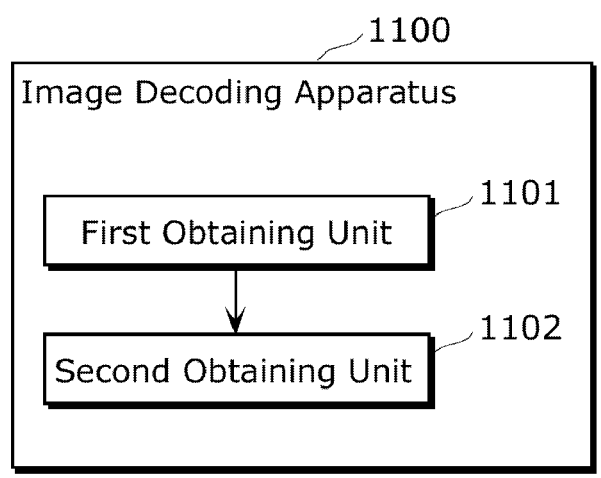
FIG. 11A is a block diagram which shows a structure of an image decoding apparatus according to Embodiment 4.

FIG. 11A is a block diagram which shows a structure of the image decoding apparatus according to Embodiment 4. The image decoding apparatus 1100 shown in FIG. 11A decodes the images included in the coded stream. Then, the image decoding apparatus 1100 includes a first obtaining unit 1101 and a second obtaining unit 1102. The first obtaining unit 1101 and the second obtaining unit 1102 mainly correspond to the entropy decoding unit 704 according to Embodiment 2.

Figure 11B:
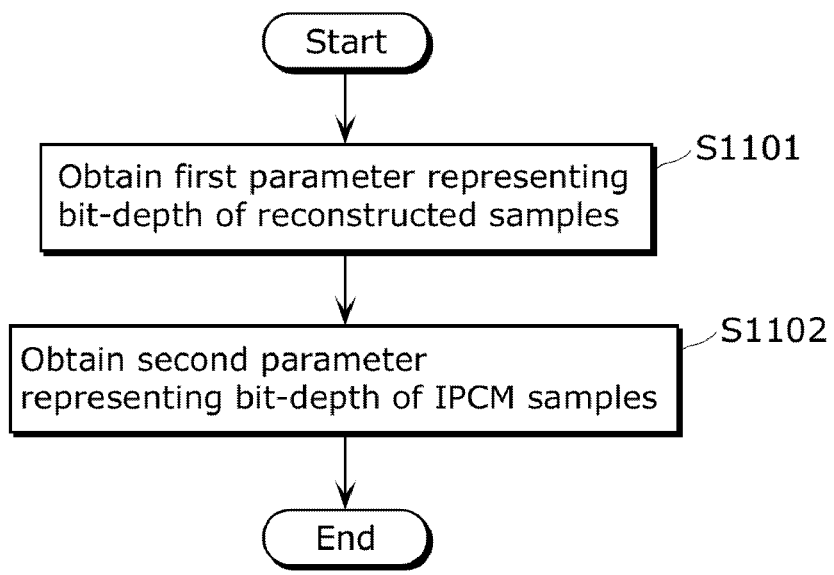
FIG. 11B is a flowchart which shows operations performed by the image decoding apparatus according to Embodiment 4.

FIG. 11B is a flowchart which shows operations performed by the image decoding apparatus 1100 shown in FIG. 11A.

As shown in FIG. 11B, the first obtaining unit 1101 obtains the first parameter representing the first bit-depth that is a bit-depth of reconstructed samples of image, from the sequence parameter set in the coded stream (S1101). The second obtaining unit 1102 obtains the second parameter, which represents the second bit-depth that is a bit-depth of IPCM samples in image and is different from the first parameter, from the sequence parameter set (S1002).

Therefore, it is possible to obtain the bit-depth of IPCM samples separately and independently from the bit-depth of reconstructed samples. Therefore, redundant data of IPCM samples can be reduced. As a result, coding efficiency can be improved.

Embodiment 5

The image coding apparatus according to Embodiment 5 of the present disclosure includes characteristic constituent elements in the image coding apparatus 300 described in Embodiment 1. Furthermore, the image decoding apparatus according to Embodiment includes the characteristic constituent elements in the image decoding apparatus 700 described in Embodiment 2. It should be noted that, in Embodiment 5, arbitrarily-addable constituent elements are described in addition to the constituent elements described in Embodiment 4.

Figure 12:
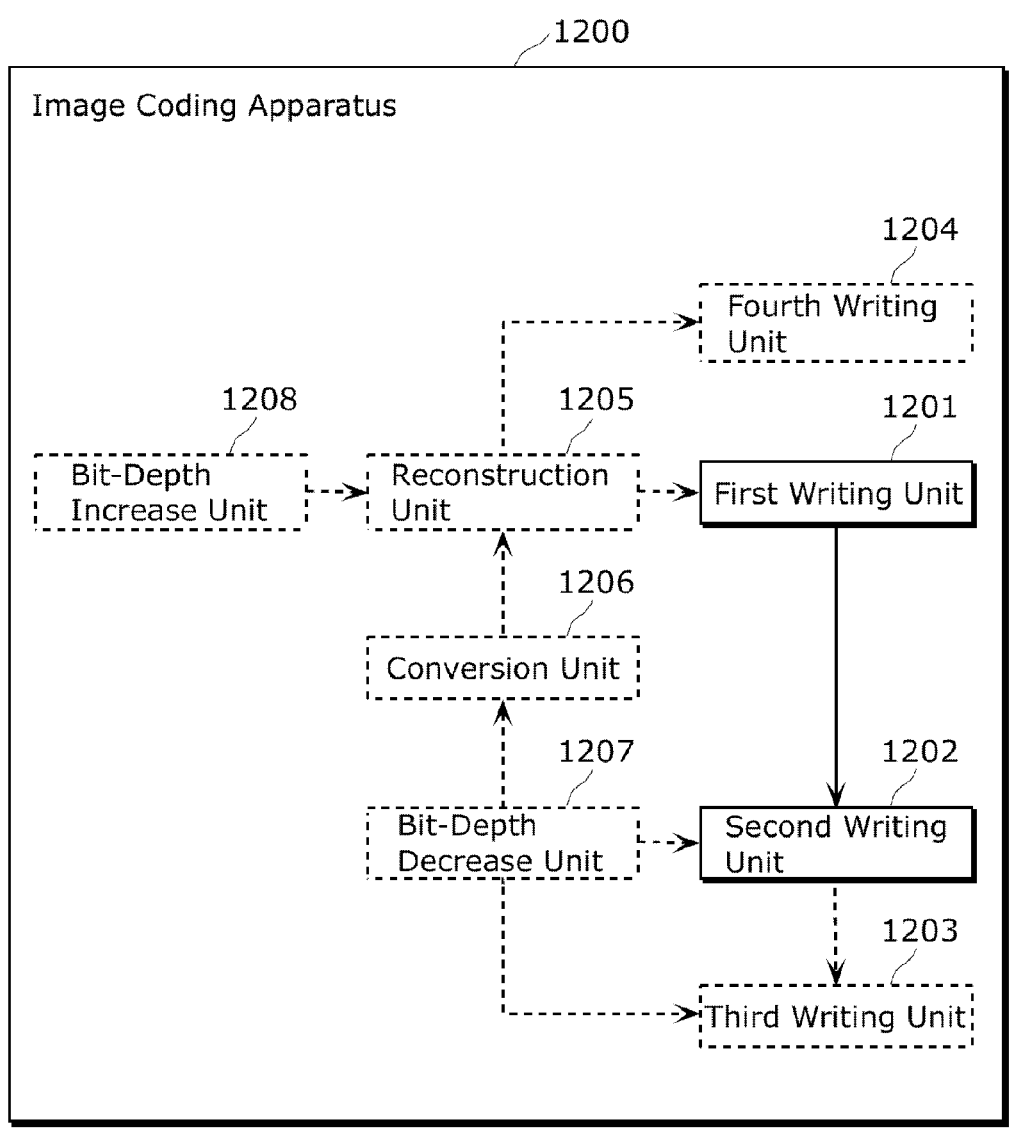
FIG. 12 is a block diagram which shows a structure of an image coding apparatus according to Embodiment 5 of the present disclosure.

FIG. 12 is a block diagram which shows a structure of the image coding apparatus according to the present embodiment. The image coding apparatus 1200 shown in FIG. 12 includes a first writing unit 1201, a second writing unit 1202, a third writing unit 1203, a fourth writing unit 1204, a reconstruction unit 1205, a conversion unit 1206, a bit-depth decrease unit 1207, and a bit-depth increase unit 1208.

The first writing unit 1201 and the second writing unit 1202 are the same constituent elements as the first writing unit 1001 and the second writing unit 1002 in the image coding apparatus 1000, respectively. The other constituent elements are additional constituent elements, a part or all of which is arbitrarily added.

The third writing unit 1203 mainly corresponds to the multiplexer 316B according to Embodiment 1. The fourth writing unit 1204 mainly corresponds to the entropy coding unit 320 according to Embodiment 1. The conversion unit 1206 mainly corresponds to the N-bit-depth conversion unit 302 B according to Embodiment 1. The bit-depth decrease unit 1207 mainly corresponds to the optional processing unit 324 according to Embodiment 1. The bit-depth increase unit 1208 mainly corresponds to the N-bit-depth conversion unit 302A according to Embodiment 1.

The reconstruction unit 1205 mainly corresponds to the adder 304B according to Embodiment 1. The reconstruction unit 1205 may include the inverse quantization unit 310, the inverse transformation unit 312, the filter unit 319, and the inter/intra prediction unit 314 according to Embodiment 1.

Figure 13:
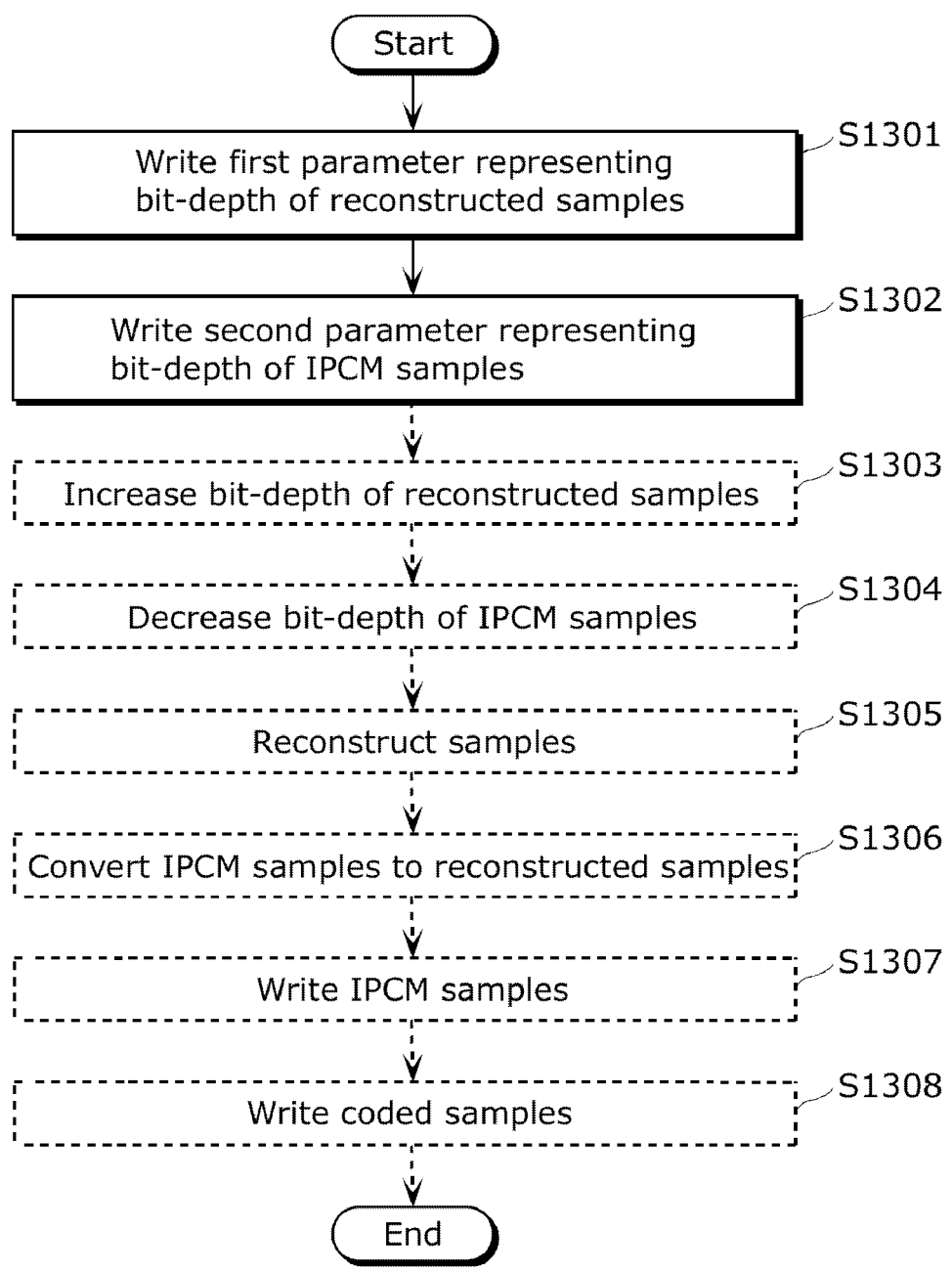
FIG. 13 is a flowchart which shows operations performed by an image coding apparatus according to Embodiment 5.

FIG. 13B is a flowchart which shows operations performed by the image coding apparatus 1200 shown in FIG. 12. As shown in FIG. 13, the first writing unit 1201 writes the first parameter representing the first bit-depth that is a bit-depth of reconstructed samples of image, to a sequence parameter set in a coded stream to be generated (S1301).

The second writing unit 1201 writes the second parameter, which represents the second bit-depth that is a bit-depth of IPCM samples in image and is different from the first parameter, into the sequence parameter set (S1302). Here, typically, the second writing unit 1202 writes the second parameter representing the second bit-depth that is equal to or smaller than the first bit-depth.

The first writing unit 1201 may write the first parameter representing the first bit-depth that is larger than the third bit-depth that is a bit-depth of original samples of image. In this case, the bit-depth increase unit 1208 converts the original samples at the third bit-depth into samples at the first bit-depth, so as to increase the bit-depth of reconstructed samples corresponding to the original samples (S1303).

The second writing unit 1202 may write the second parameter representing the second bit-depth that is smaller than the third bit-depth that is a bit-depth of original samples of image. In this case, the bit-depth decrease unit 1207 converts the original samples at the third bit-depth into samples at the second bit-depth, so as to decrease the bit-depth of IPCM samples corresponding to the original samples (S1304).

The reconstruction unit 1205 reconstructs samples at the first bit-depth from the coded samples of image, so as to generate reconstructed samples (S1305). Here, the coded samples are generated by performing at least a part of coding processing for the original samples of image. The conversion unit 1206 converts the IPCM samples at the second bit-depth into reconstructed samples at the first bit-depth (S1306).

The third writing unit 1203 writes the IPCM samples at the second bit-depth into the coded stream (S1307). The fourth writing unit 1204 writes coded samples, which are coded using the reconstructed samples at the first bit-depth, into the coded stream (S1308).

Therefore, the image coding apparatus 1200 can appropriately perform image processing by using the bit-depth of reconstructed samples and the bit-depth of IPCM samples. For example, a large bit-depth is used for reconstructed samples, and a small bit-depth is used for IPCM samples. Therefore, both image quality improvement and coding efficiency improvement can be achieved.

It should be noted that an order of steps is not limited to the order shown in FIG. 13, but may be changed. It should also be noted that it is possible to eliminate a part or all of steps, in particular, steps surrounded by a broken line. It should also be noted that the image coding apparatus 1200 may further include a coding processing unit that codes original samples using reconstructed samples. The coding processing unit mainly corresponds to the inter/intra prediction unit 314, the subtractor 304A, the entropy coding unit 320, the quantization unit 308, the conversion unit 306, and the like according to Embodiment 1.

Figure 14:
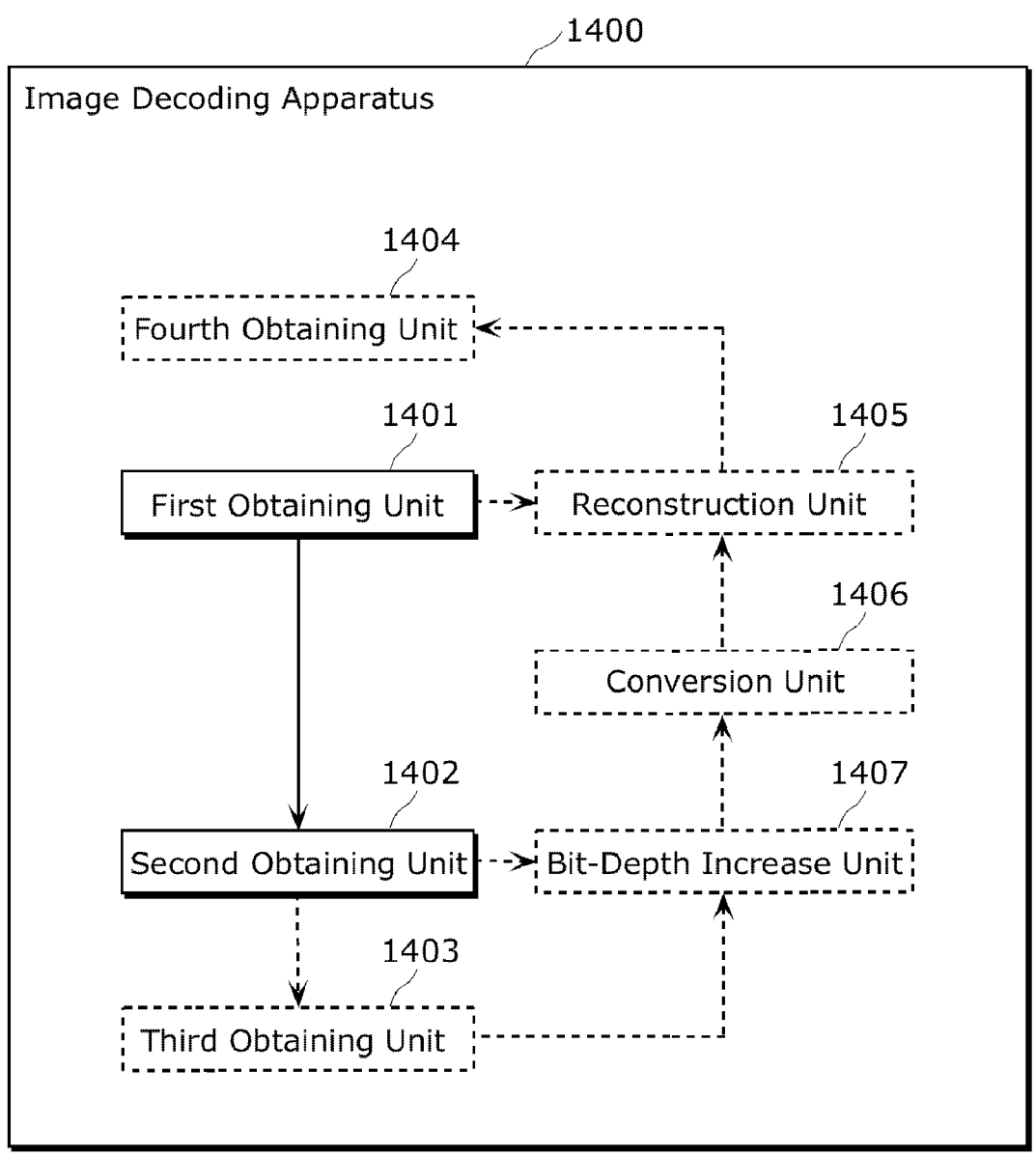
FIG. 14 is a block diagram which shows a structure of an image decoding apparatus according to Embodiment 5.

FIG. 14A is a block diagram which shows a structure of the image decoding apparatus according to the present embodiment. The image decoding apparatus 1400 shown in FIG. 14 includes a first obtaining unit 1401, a second obtaining unit 1402, a third obtaining unit 1403, a fourth obtaining unit 1404, a reconstruction unit 1405, a conversion unit 1406, and a bit-depth increase unit 1407.

The first obtaining unit 1401 and the second obtaining unit 1402 are the same constituent elements as the first obtaining unit 1101 and the second obtaining unit 1102 in the image decoding apparatus 1100, respectively. The other constituent elements are additional constituent elements, a part or all of which is arbitrarily added.

The third obtaining unit 1403 mainly corresponds to the IPCM block parsing unit 718 according to Embodiment 2. The fourth obtaining unit 1404 mainly corresponds to the entropy decoding unit 704 according to Embodiment 2. The conversion unit 1406 mainly corresponds to the N-bit-depth conversion unit 720 according to Embodiment 2. The bit-depth increase unit 1407 mainly corresponds to the N-bit-depth conversion unit 720 according to Embodiment 2.

The reconstruction unit 1405 mainly corresponds to the adder 706 according to Embodiment 2. The reconstruction unit 1405 may include the inverse quantization unit 708, the inverse transformation unit 710, the filter unit 719, and the inter/intra prediction unit 714 according to Embodiment 2.

Figure 15:
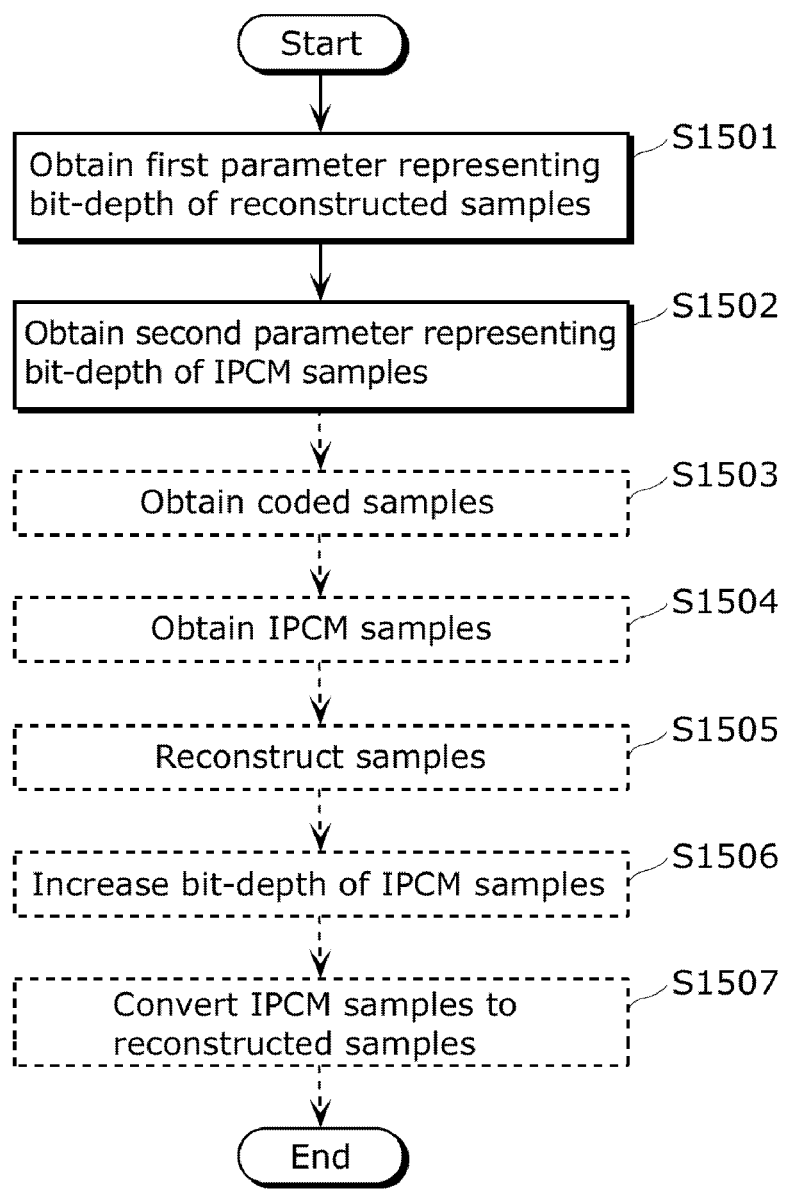
FIG. 15 is a flowchart which shows operations performed by the image decoding apparatus according to Embodiment 5.

FIG. 15 is a flowchart which shows operations performed by the image decoding apparatus 1400 shown in FIG. 14. As shown in FIG. 15, the first obtaining unit 1401 obtains the first parameter representing the first bit-depth that is a bit-depth of reconstructed samples of image, from the sequence parameter set in the coded stream (S1501).

The second obtaining unit 1402 obtains the second parameter, which represents the second bit-depth that is a bit-depth of IPCM samples in image and is different from the first parameter, from the sequence parameter set (S1502). Here, typically, the second obtaining unit 1402 obtains the second parameter representing the second bit-depth that is equal to or smaller than the first bit-depth.

The second obtaining unit 1402 may obtain the second parameter representing the second bit-depth that is smaller than the first bit-depth. For example, the second obtaining unit 1402 obtains the second parameter representing the second bit-depth that is smaller than the third bit-depth that is a bit-depth of original samples of image. For example, the first obtaining unit 1401 obtains the first parameter representing the first bit-depth that is larger than the third bit-depth that is a bit-depth of original samples of image.

The fourth obtaining unit 1404 obtains coded samples to be decoded using the reconstructed samples at the first bit-depth, from the coded stream (S1503). The third obtaining unit 1403 obtains the IPCM samples at the second bit-depth from the coded stream (S1504). The reconstruction unit 1405 reconstructs samples at the first bit-depth from the coded samples of image, so as to generate reconstructed samples (S1505).

When the second obtaining unit 1402 obtains the second parameter representing the second bit-depth that is smaller than the first bit-depth, the bit-depth increase unit 1407 converts IPCM samples at the second bit-depth into samples at the first bit-depth, so as to increase the bit-depth of IPCM samples (S1506) The transformation unit 1406 converts the IPCM samples at the second bit-depth into reconstructed samples at the first bit-depth (S1507).

Therefore, the image decoding apparatus 1400 can appropriately perform image processing by using the bit-depth of reconstructed samples and the bit-depth of IPCM samples. For example, a large bit-depth is used for reconstructed samples, and a small bit-depth is used for IPCM samples. Therefore, both image quality improvement and coding efficiency improvement can be achieved.

It should be noted that an order of steps is not limited to the order shown in FIG. 15, but may be changed. It should also be noted that it is possible to eliminate a part or all of steps, in particular, steps surrounded by a broken line. It should also be noted that the image decoding apparatus 1400 may further include a decoding processing unit that decodes coded samples by using reconstructed samples. The decoding processing unit mainly corresponds to the inter/intra prediction unit 714, the adder 706, the entropy decoding unit 704, the inverse quantization unit 708, the inverse transformation unit 710, and the like according to Embodiment 2.

Although the image coding apparatus and the image decoding apparatus according to the present disclosure have been described with reference to a plurality of embodiments as above, the present disclosure is not limited to these embodiments. Those skilled in the art will be readily appreciated that various modifications and combinations of the constituent elements are possible in the exemplary embodiments. Such modifications and combinations are also embodiments of the present disclosure.

For example, a step to be performed by a specific processing unit may be performed by a different processing unit. It should be noted that an order of executing steps may be changed, or a plurality of steps may be executed in parallel.

It should also be noted that the image coding apparatus and the image decoding apparatus according to the embodiments of the present disclosure may be implemented as an image coding/decoding apparatus that is a combination of arbitrary constituent elements included in the mage coding apparatus and the image decoding apparatus. For example, the image coding/decoding apparatus according to an embodiment of the present disclosure includes: an image coding unit that is the image coding apparatus according to one of the embodiments of the present disclosure; and an image decoding unit that is the image decoding apparatus according to one of the embodiments of the present disclosure.

It should also be noted that the present disclosure may be implemented not only as the image coding apparatus and the image decoding apparatus, but also as methods including steps performed by the processing units in the image coding apparatus and the image decoding apparatus. For example, these steps are executed by a computer. Furthermore, the present disclosure may be implemented as a program causing a computer to execute the steps included in the methods. Moreover, the present disclosure may be implemented as a non-transitory computer-readable recording medium, such as a CD-ROM, on which the program is recorded.

The constituent elements included in the image coding apparatus and the image decoding apparatus may be implemented into a Large Scale Integration (LSI) which is an integrated circuit. These constituent elements may be integrated separately, or a part or all of them may be integrated into a single chip. Here, the integrated circuit is referred to as a LSI, but the integrated circuit can be called an IC, a system LSI, a super LSI or an ultra LSI depending on their degrees of integration.

It should be noted that the technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Furthermore, if due to the progress of semiconductor technologies or their derivations, new technologies for integrated circuits appear to be replaced with the LSIs, it is, of course, possible to use such technologies to implement the constituent elements included in the image coding apparatus and the image decoding apparatus as an integrated circuit.

Embodiment 6

The processing described in each of Embodiments can be simply implemented in an independent computer system, by recording, in a recording medium, a program for implementing the configurations of the moving picture coding method (image coding method) and the moving picture decoding method (image decoding method) described in each of Embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of Embodiments and systems using thereof will be described. The system has a feature of having an image coding and decoding apparatus that includes an image encoding apparatus using the image encoding method and an image decoding apparatus using the image decoding method. Other configurations in the system can be changed as appropriate depending on the cases.

Figure 16:
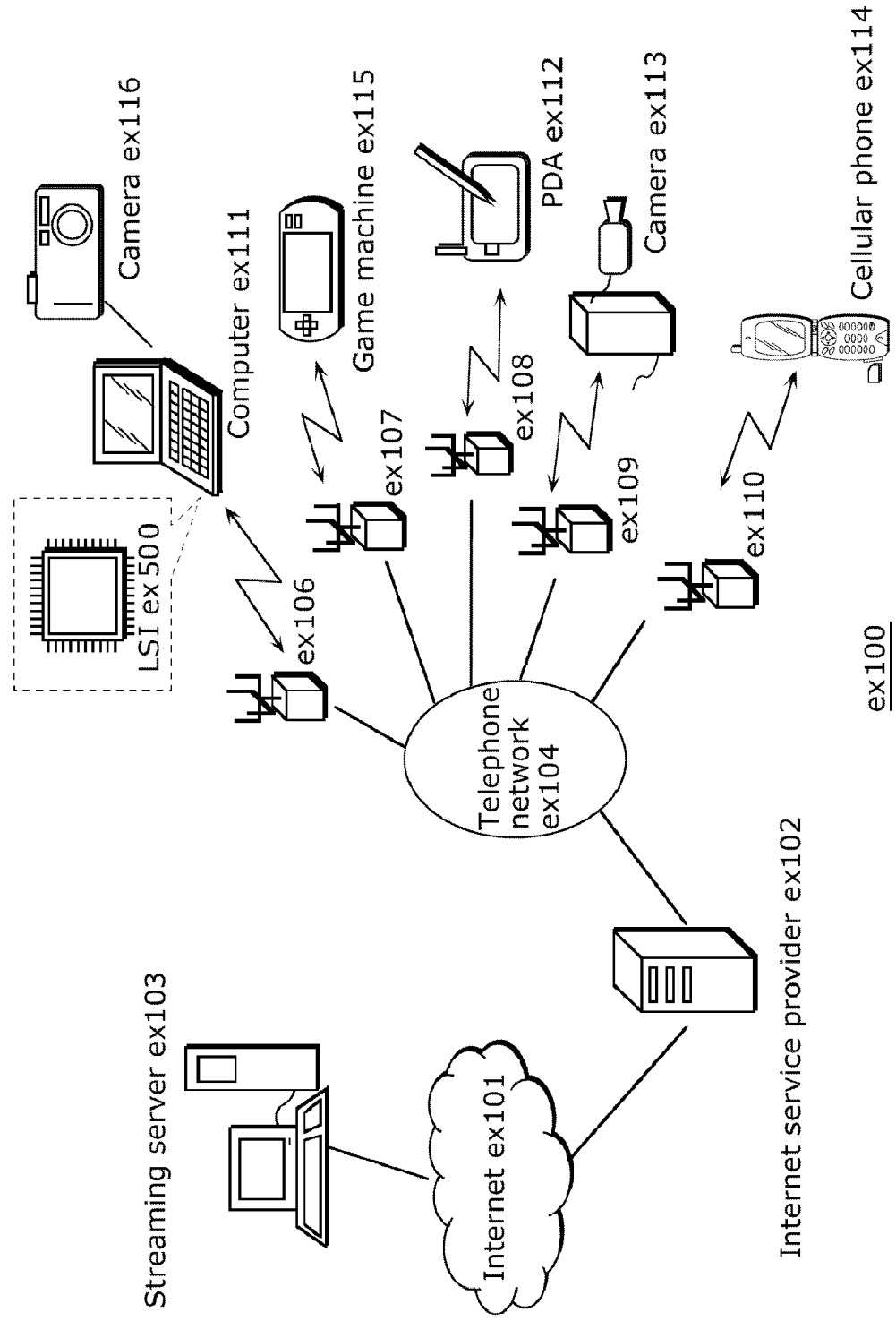
FIG. 16 shows an overall configuration of a content providing system for implementing content distribution services.

FIG. 16 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 16, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of Embodiments (i.e., the camera functions as the image coding apparatus of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., the devices each function as the image decoding apparatus of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 17:
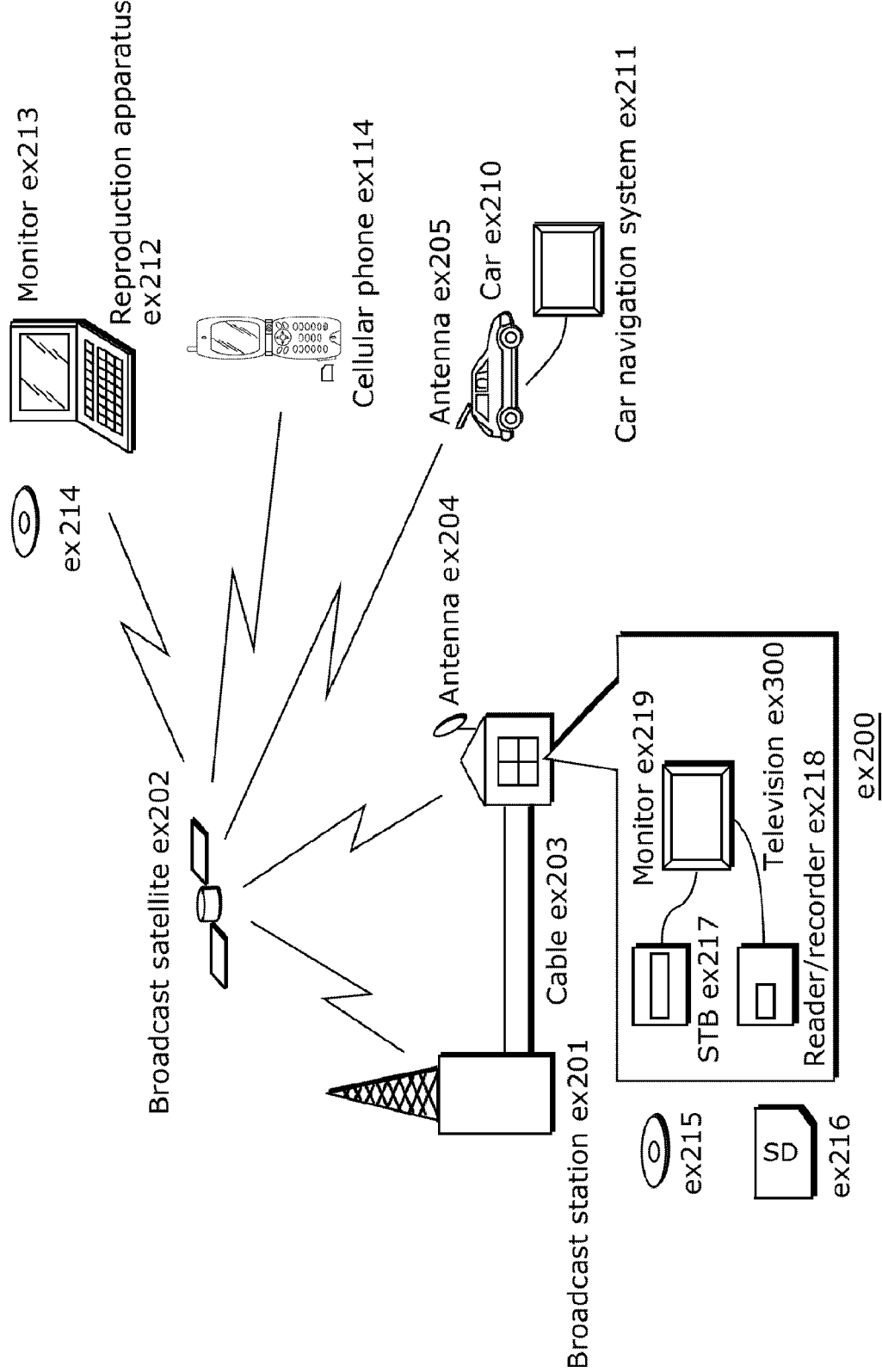
FIG. 17 shows an overall configuration of a digital broadcasting system.

Aside from the example of the content providing system ex100, at least one of the moving picture coding apparatus (image coding apparatus) and the moving picture decoding apparatus (image decoding apparatus) described in each of Embodiments may be implemented in a digital broadcasting system ex200 illustrated in FIG. 17. More specifically, a broadcast station ex201 communicates or transmits, via radio waves to a broadcast satellite ex202, multiplexed data obtained by multiplexing audio data and others onto video data. The video data is data coded by the moving picture coding method described in each of Embodiments (i.e., data coded by the image coding apparatus of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., the device functions as the image coding apparatus of the present invention).

Furthermore, a reader/recorder ex218 (i) reads and decodes the multiplexed data recorded on a recording media ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of Embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 18:
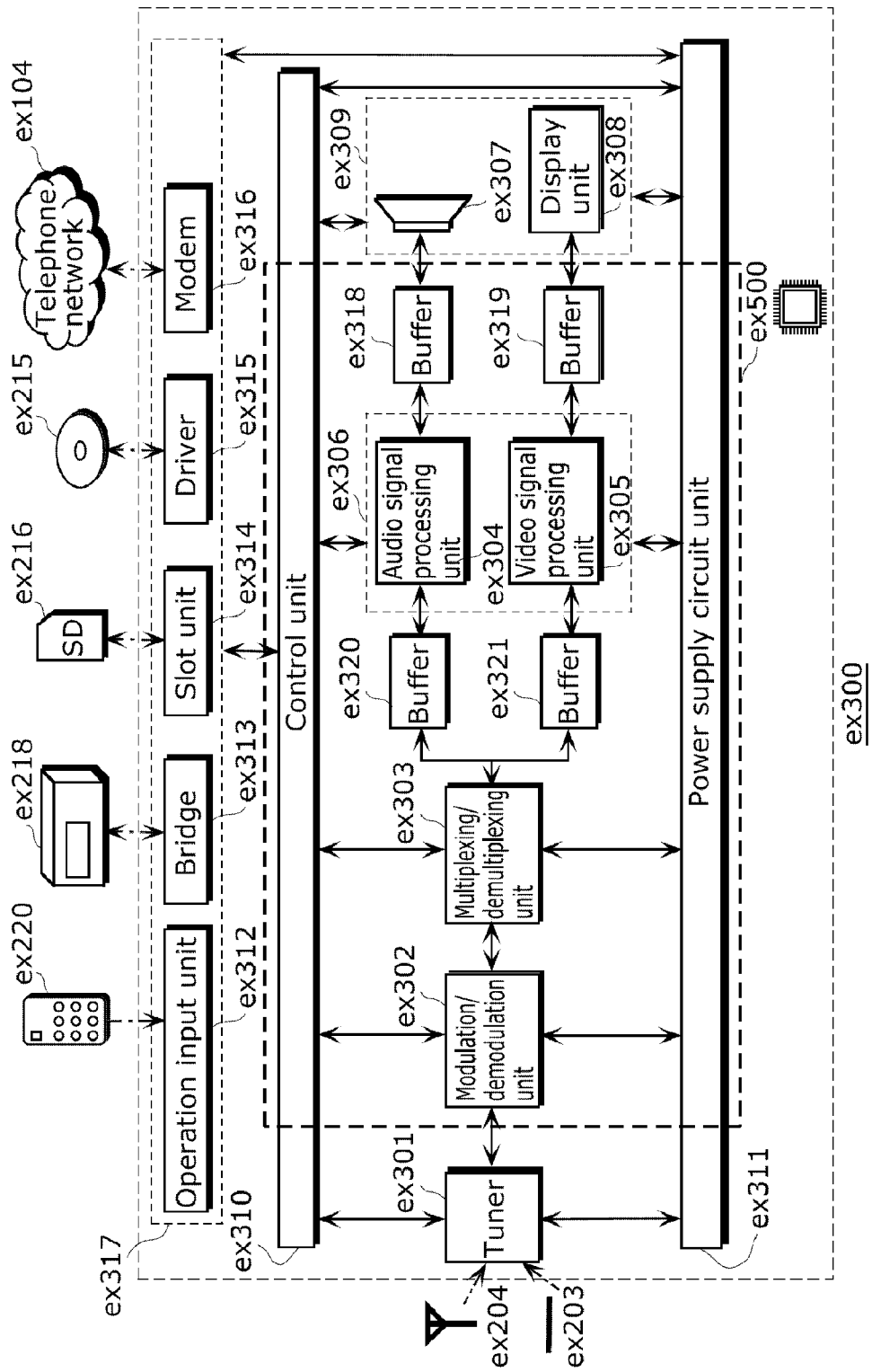
FIG. 18 shows a block diagram illustrating an example of a configuration of a television.

FIG. 18 illustrates the television (receiver) ex300 that uses the moving picture coding method and the moving picture decoding method described in each of Embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, (which function as the image coding apparatus and the image decoding apparatus), respectively; and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexer the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of Embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of Embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 19:
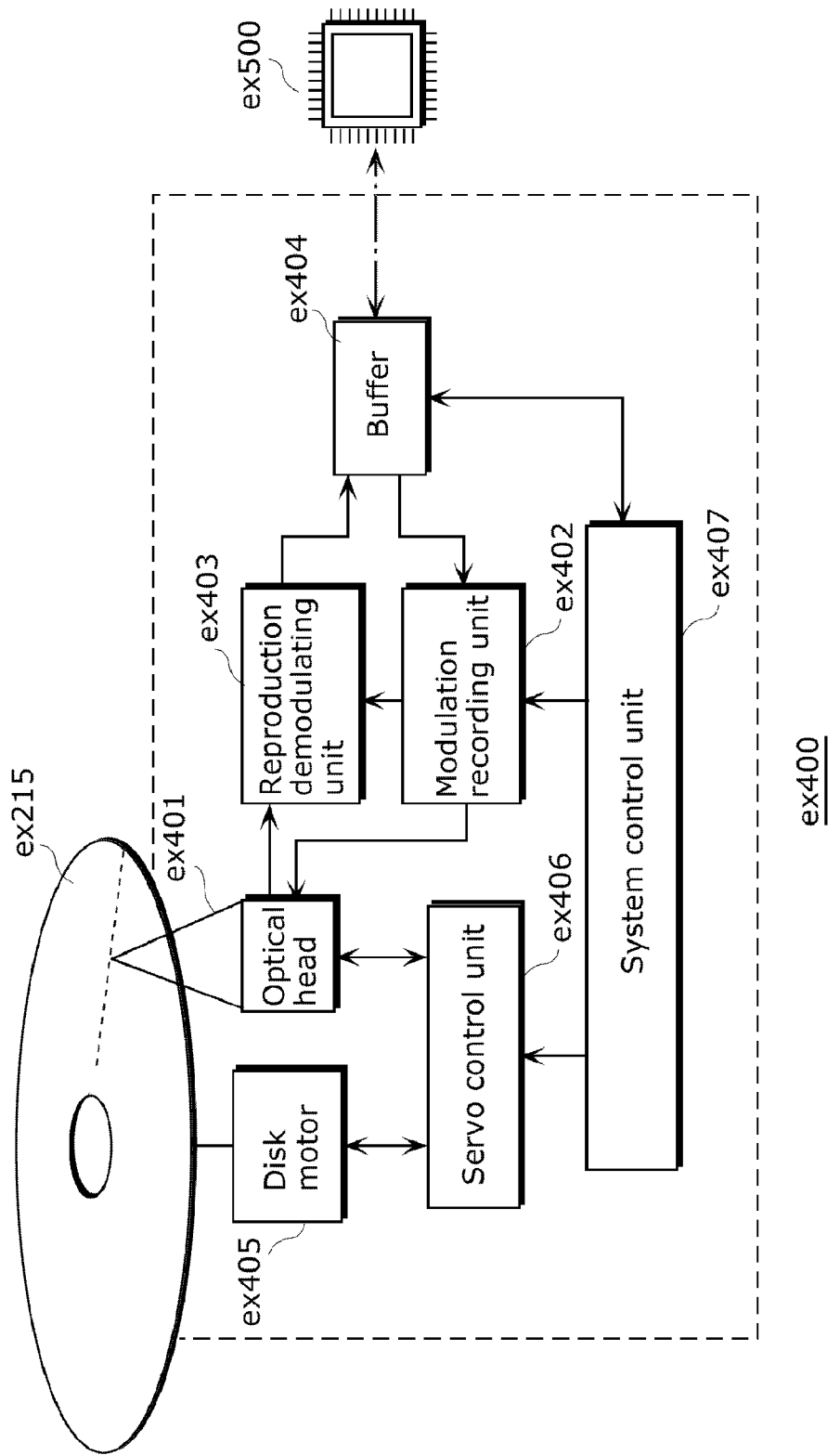
FIG. 19 shows a block diagram illustrating an example of a configuration of an information reproducing/recording unit that reads and writes information from and on a recording medium that is an optical disk.

As an example, FIG. 19 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 20:
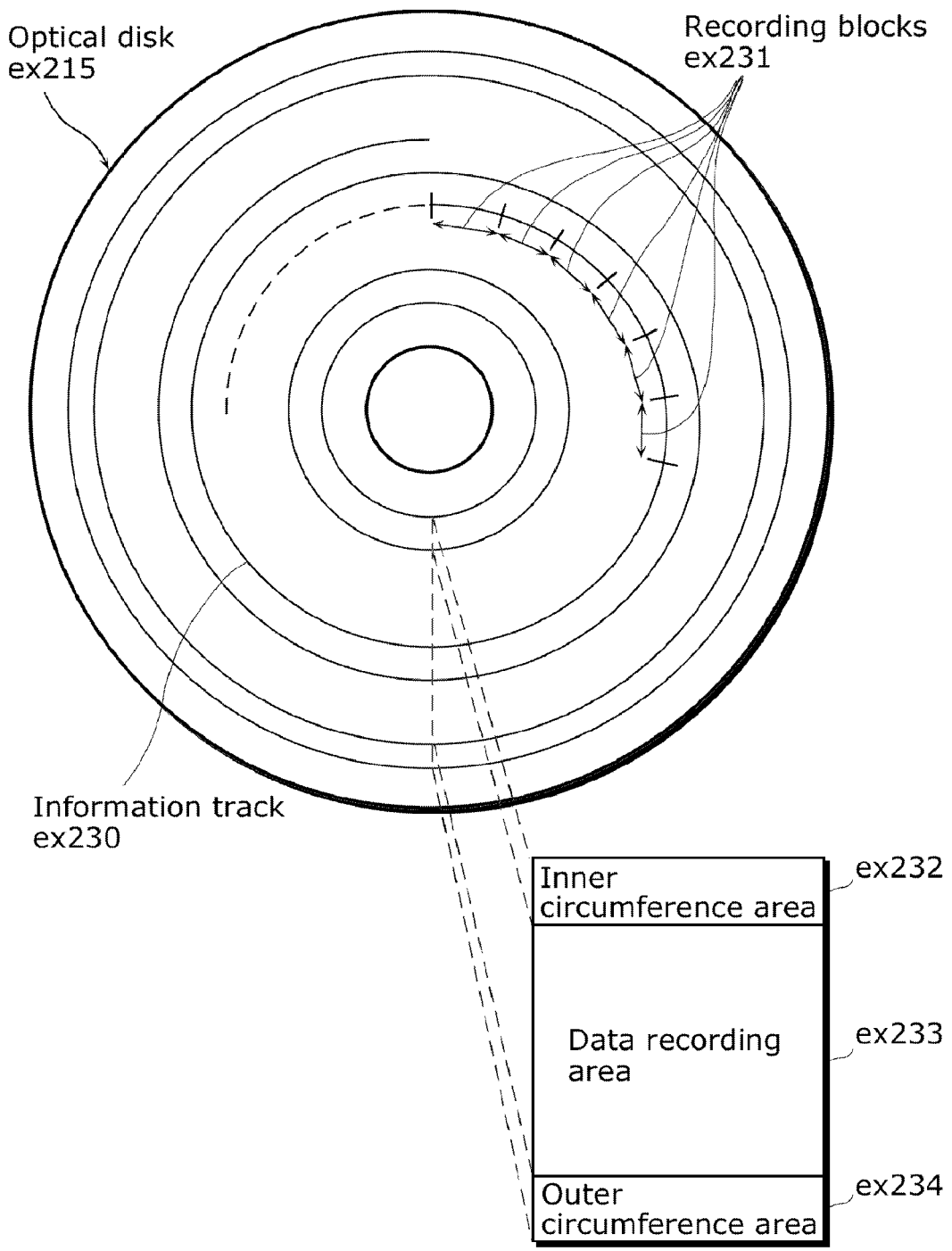
FIG. 20 shows an example of a configuration of a recording medium that is an optical disk.

FIG. 20 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 18. The same will be true for the configuration of the computer ex111, the cellular phone ex114, and others.

Figure 21A:
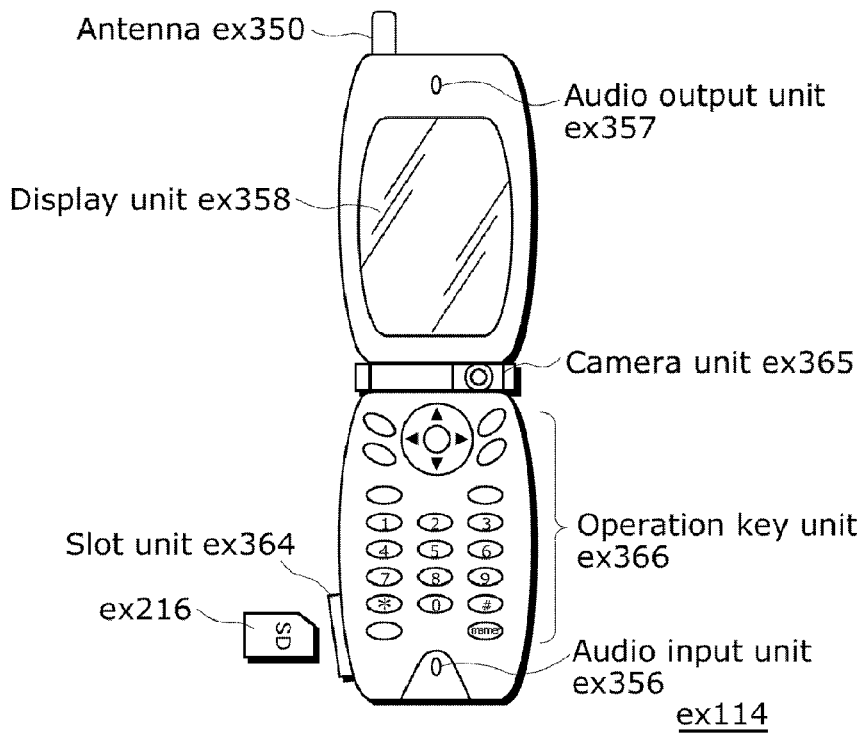
FIG. 21A shows an example of a cellular phone.

FIG. 21A illustrates the cellular phone ex114 that uses the moving picture coding method and the moving picture decoding method described in Embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 21B:
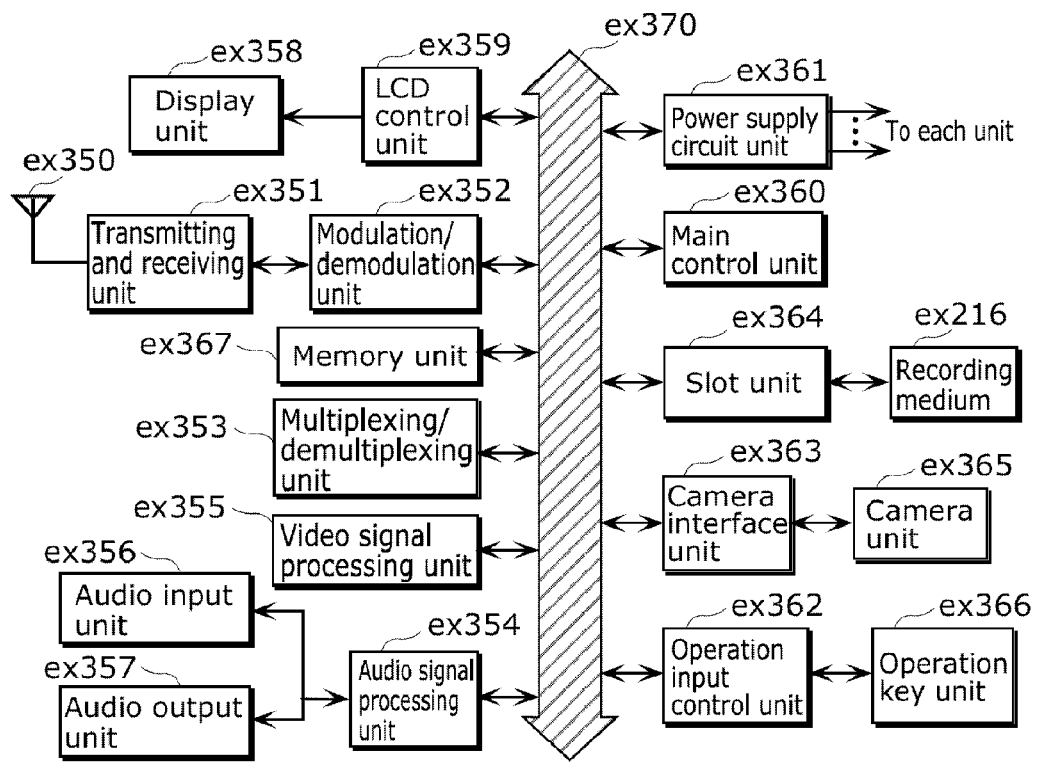
FIG. 21B is a block diagram showing an example of a configuration of a cellular phone.

Next, an example of a configuration of the cellular phone ex114 will be described with reference to FIG. 21B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of Embodiments (i.e., functions as the image coding apparatus of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of Embodiments (i.e., functions as the image decoding apparatus of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of Embodiments can be used in any of the devices and systems described. Thus, the advantages described in each of Embodiments can be obtained.

Furthermore, the present invention is not limited to Embodiments, and various modifications and revisions are possible without departing from the scope of the present invention.

Embodiment 7

Video data can be generated by switching, as necessary, between (i) the moving picture coding method or the moving picture coding apparatus shown in each of Embodiments and (ii) a moving picture coding method or a moving picture coding apparatus in conformity with a different standard, such as MPEG-2, MPEG4-AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of Embodiments will be hereinafter described. The multiplexed data is a digital stream in the MPEG2-Transport Stream format.

FIG. 22 illustrates a structure of the multiplexed data. As illustrated in FIG. 22, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of Embodiments, or in a moving picture coding method or by a moving picture coding apparatus in conformity with a conventional standard, such as MPEG-2, MPEG4-AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 23:
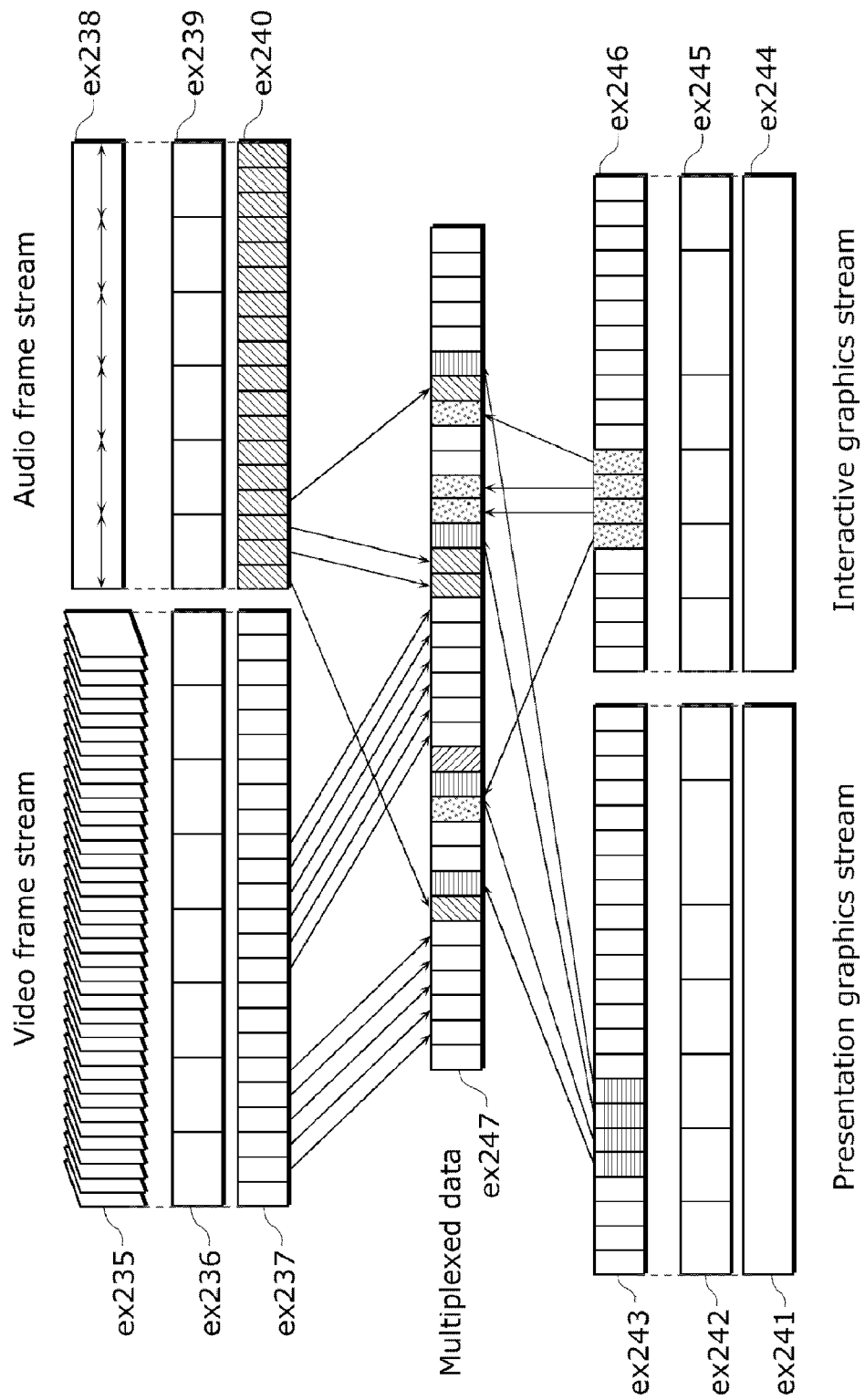
FIG. 23 schematically shows how each stream is multiplexed in multiplexed data.

FIG. 23 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 24:
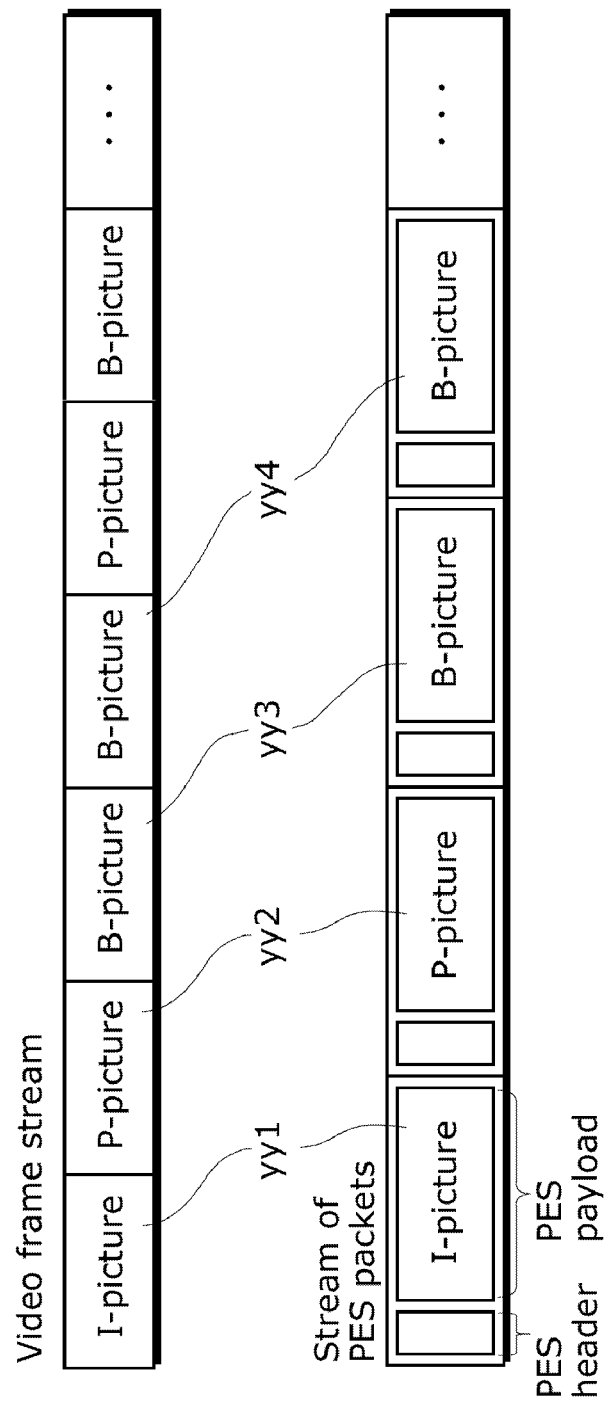
FIG. 24 shows how a video stream is stored in a stream of PES packets in more detail.

FIG. 24 illustrates how a video stream is stored in a stream of PES packets in more detail. The first bar in FIG. 24 shows a video frame stream in a video stream. The second bar shows the stream of PES packets. As indicated by arrows denoted as yy1, yy2, yy3, and yy4 in FIG. 24, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 25:
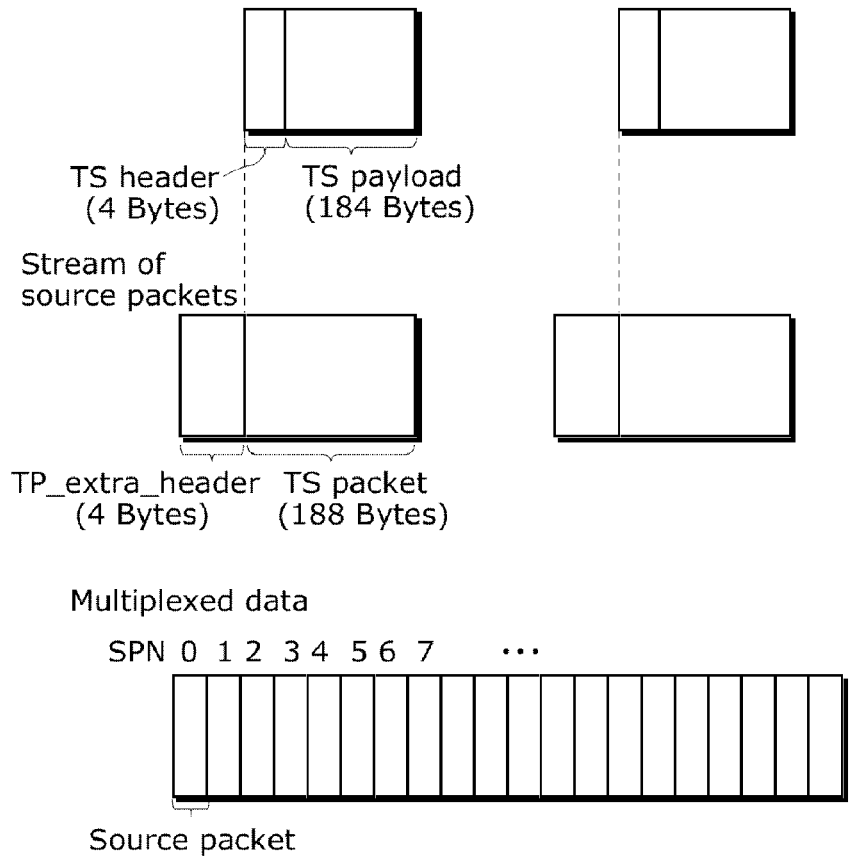
FIG. 25 shows a structure of TS packets and source packets in the multiplexed data.

FIG. 25 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 25. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 26:
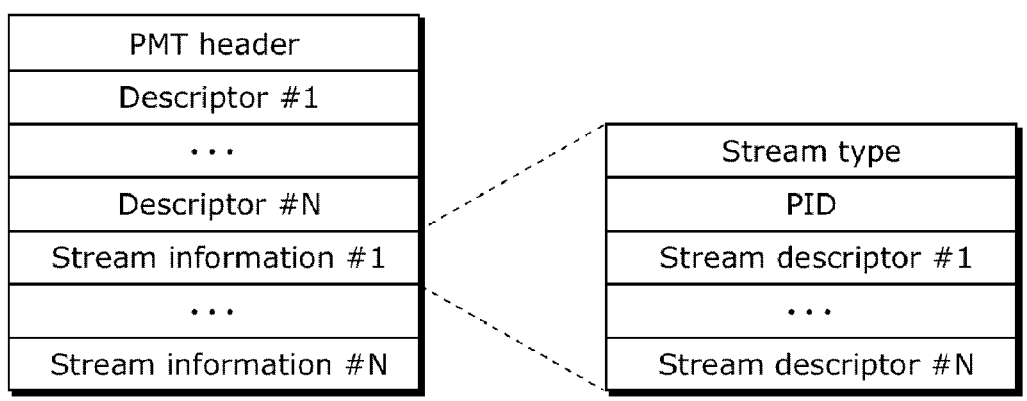
FIG. 26 shows a data structure of a PMT.

FIG. 26 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 27:
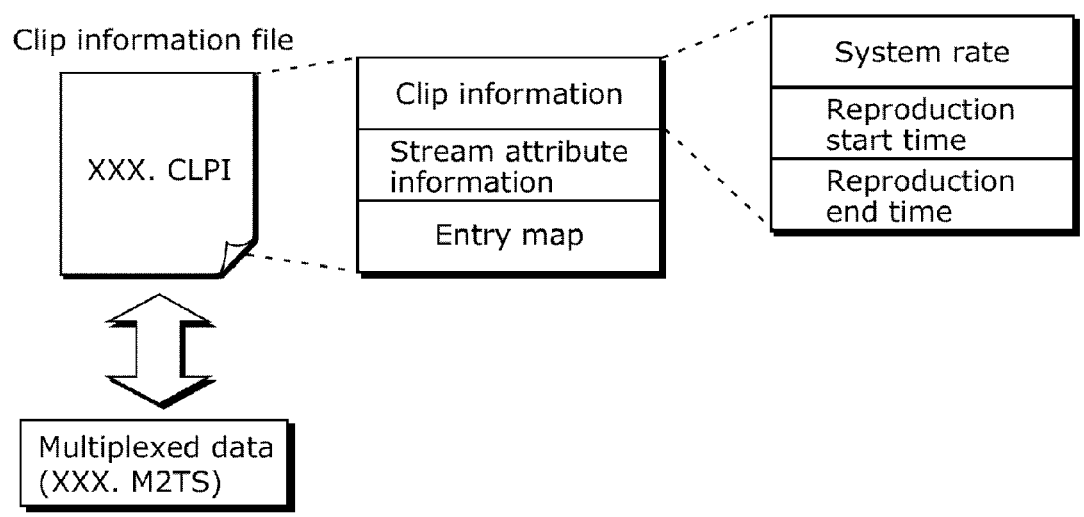
FIG. 27 shows an internal structure of multiplexed data information.

Each of the multiplexed data information files is management information of the multiplexed data as shown in FIG. 27. The multiplexed data information files are in one to one correspondence with the multiplexed data, and each of the files includes multiplexed data information, stream attribute information, and an entry map.

As illustrated in FIG. 27, the multiplexed data includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 28:
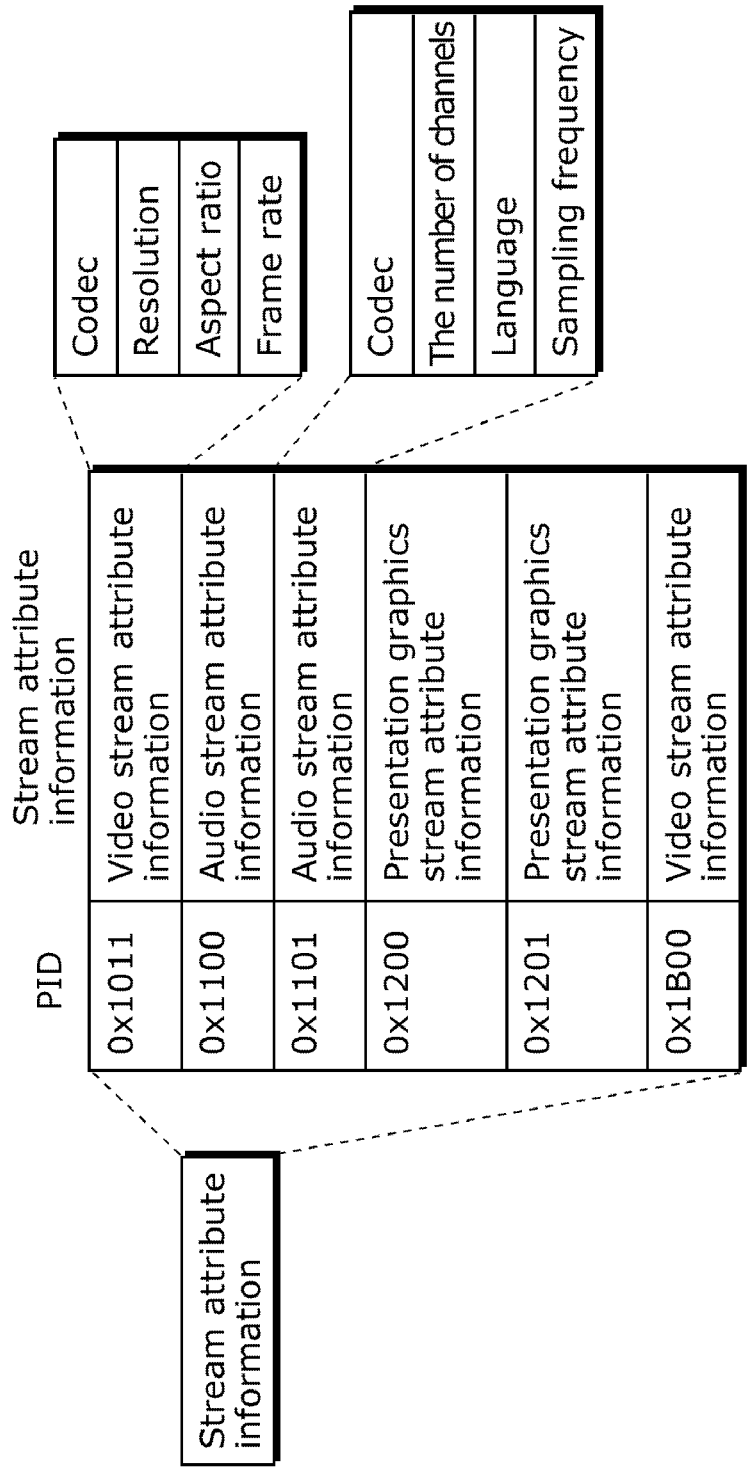
FIG. 28 shows an internal structure of stream attribute information.

As shown in FIG. 28, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of Embodiments includes a step or a unit for allocating unique information indicating video data generated by the moving picture coding method or the moving picture coding apparatus in each of Embodiments, to the stream type included in the PMT or the video stream attribute information. With the configuration, the video data generated by the moving picture coding method or the moving picture coding apparatus described in each of Embodiments can be distinguished from video data that conforms to another standard.

Figure 29:
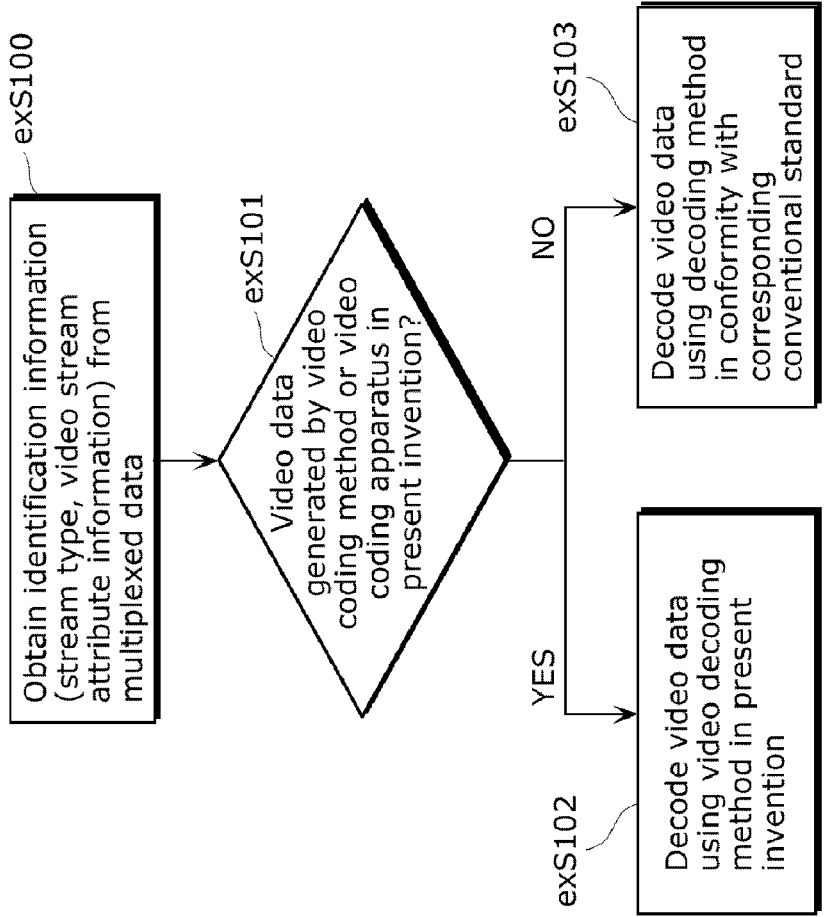
FIG. 29 shows steps for identifying video data.

Furthermore, FIG. 29 illustrates steps of the moving picture decoding method according to the present embodiment. In Step exS100, the stream type included in the PMT or the video stream attribute information is obtained from the multiplexed data. Next, in Step exS101, it is determined whether or not the stream type or the video stream attribute information indicates that the multiplexed data is generated by the moving picture coding method or the moving picture coding apparatus in each of Embodiments. When it is determined that the stream type or the video stream attribute information indicates that the multiplexed data is generated by the moving picture coding method or the moving picture coding apparatus in each of Embodiments, in Step exS102, decoding is performed by the moving picture decoding method in each of Embodiments. Furthermore, when the stream type or the video stream attribute information indicates conformance to the conventional standards, such as MPEG-2, MPEG4-AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of Embodiments can perform decoding. Even when multiplexed data that conforms to a different standard, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 8

Figure 30:
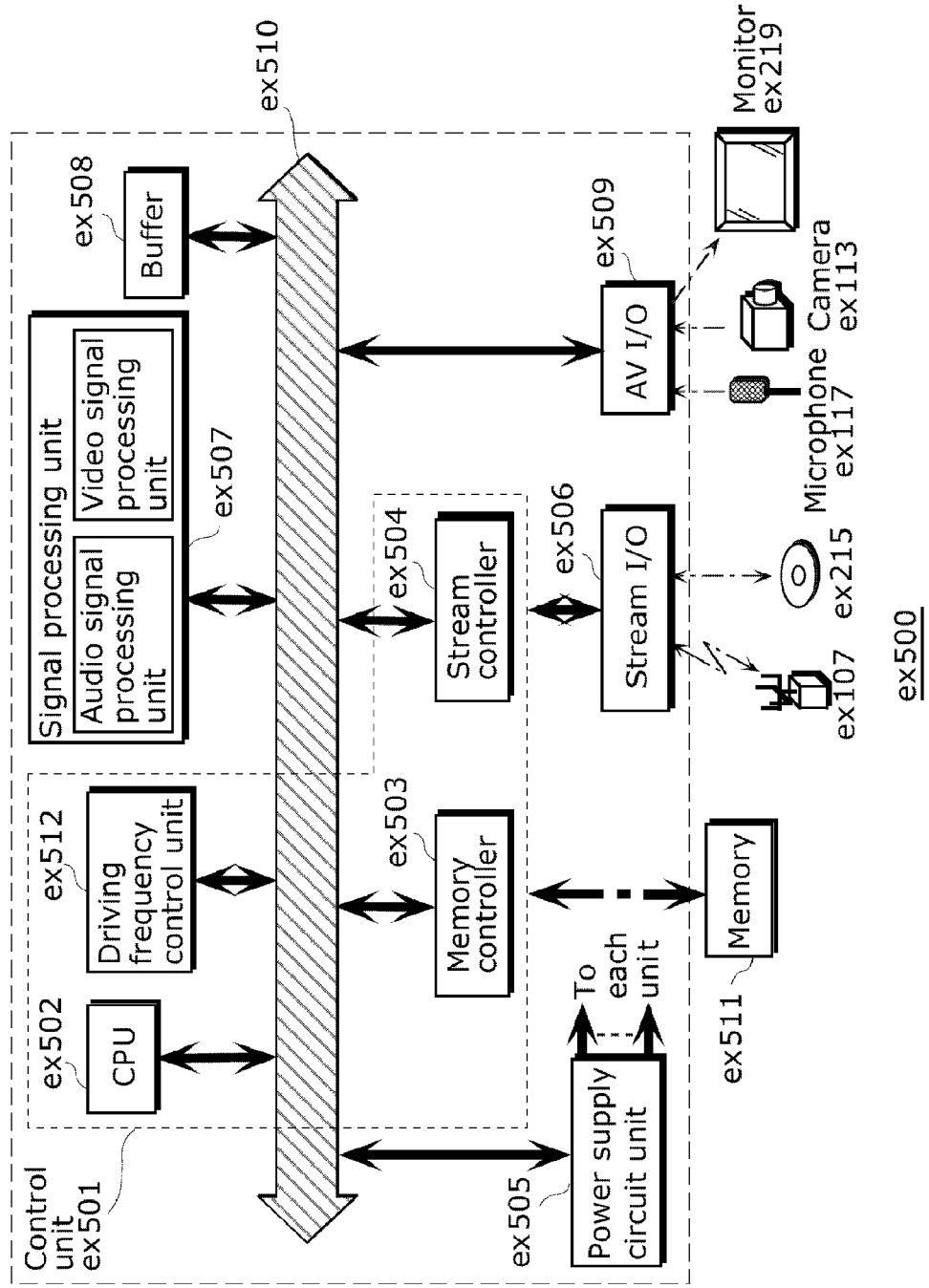
FIG. 30 shows an example of a configuration of an integrated circuit for implementing the moving picture coding method and the moving picture decoding method according to each of Embodiments.

Each of the moving picture coding method, the moving picture coding apparatus, the moving picture decoding method, and the moving picture decoding apparatus in each of Embodiments is typically achieved in the form of an integrated circuit or a Large Scale Integrated (LSI) circuit. As an example of the LSI, FIG. 30 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of Embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording media ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 9

When video data generated in the moving picture coding method or by the moving picture coding apparatus described in each of Embodiments is decoded, compared to when video data that conforms to a conventional standard, such as MPEG-2, MPEG4-AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 31:
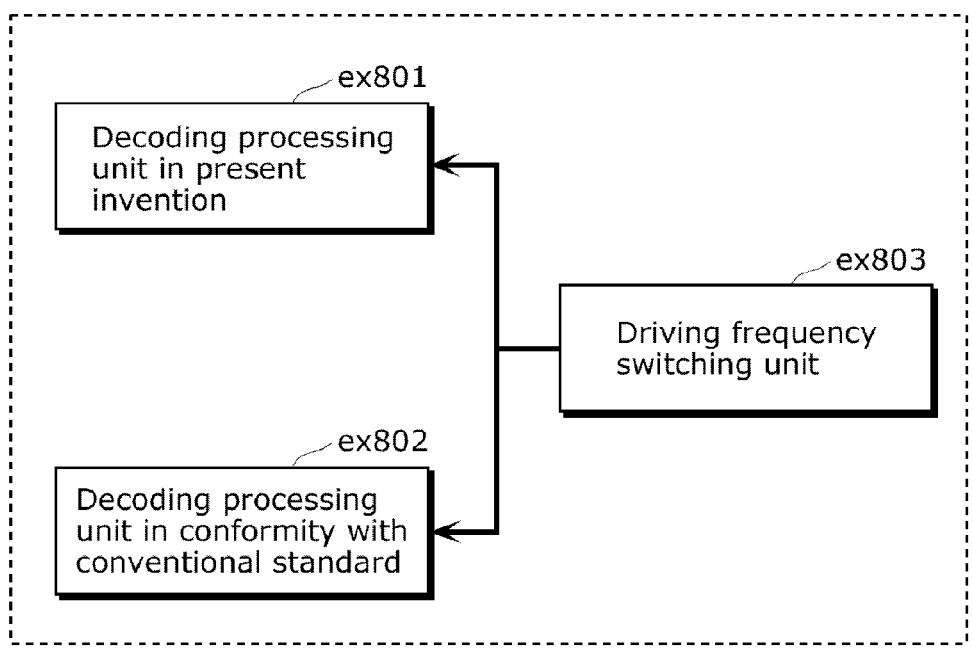
FIG. 31 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 31 illustrates a configuration ex800 in the present embodiment. A driving frequency switching unit ex803 sets a driving frequency to a higher driving frequency when video data is generated by the moving picture coding method or the moving picture coding apparatus described in each of Embodiments. Then, the driving frequency switching unit ex803 instructs a decoding processing unit ex801 that executes the moving picture decoding method described in each of Embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of Embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 30. Here, each of the decoding processing unit ex801 that executes the moving picture decoding method described in each of Embodiments and the decoding processing unit ex802 that conforms to the conventional standard corresponds to the signal processing unit ex507 in FIG. 30. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 7 is probably used for identifying the video data. The identification information is not limited to the one described in Embodiment 7 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 33. The driving frequency can be selected by storing the look-up table in the buffer ex508 and in an internal memory of an LSI, and with reference to the look-up table by the CPU ex502.

Figure 32:
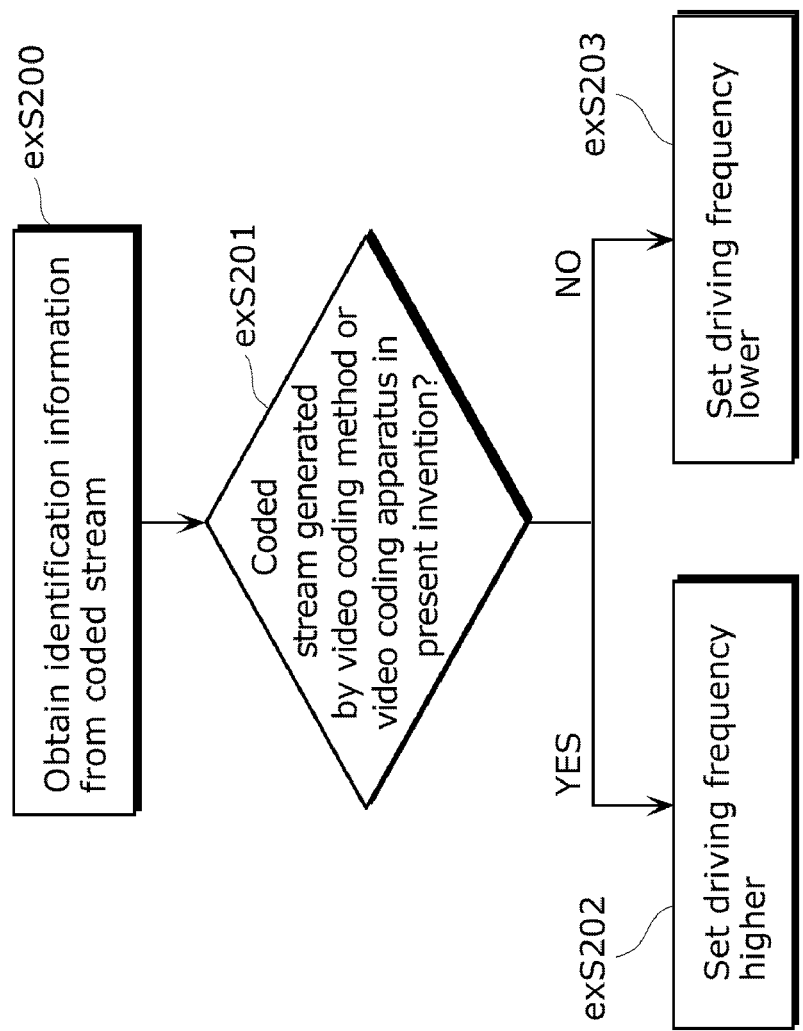
FIG. 32 shows steps for identifying video data and switching between driving frequencies.

FIG. 32 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of Embodiments, based on the identification information. When the video data is generated by the moving picture coding method and the moving picture coding apparatus described in each of Embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG4-AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of Embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG 4-AVC is larger than the processing amount for decoding video data generated by the moving picture coding method and the moving picture coding apparatus described in each of Embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of Embodiments, the voltage to be applied to the LSI ex500 or the apparatus including the LSI ex500 is probably set higher. When the identification information indicates that the video data conforms to the conventional standard, such as MPEG-2, MPEG4-AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of Embodiments, the driving of the CPU ex502 does not probably have to be suspended. When the identification information indicates that the video data conforms to the conventional standard, such as MPEG-2, MPEG4-AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of Embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG4-AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 10

There are cases where a plurality of video data that conforms to different standards, is provided to the devices and systems, such as a television and a mobile phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of Embodiments and the decoding processing unit that conforms to the conventional standard, such as MPEG-2, MPEG4-AVC, and VC-1 are partly shared. Ex900 in FIG. 34A shows an example of the configuration. For example, the moving picture decoding method described in each of Embodiments and the moving picture decoding method that conforms to MPEG4-AVC have, partly in common, the details of processing, such as entropy coding, inverse quantization, deblocking filtering, and motion compensated prediction. The details of processing to be shared probably include use of a decoding processing unit ex902 that conforms to MPEG4-AVC. In contrast, a dedicated decoding processing unit ex901 is probably used for other processing unique to the present invention. Since the present invention is characterized by pulse code modulation in particular, for example, the dedicated decoding processing unit ex901 is used for pulse code modulation. Otherwise, the decoding processing unit is probably shared for one of the entropy coding, inverse quantization, deblocking filtering, and motion compensation, or all of the processing. The decoding processing unit for implementing the moving picture decoding method described in each of Embodiments may be shared for the processing to be shared, and a dedicated decoding processing unit may be used for processing unique to that of MPEG4-AVC.

Furthermore, ex1000 in FIG. 34B shows another example in that processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the moving picture decoding method in the present invention and the conventional moving picture decoding method. Here, the dedicated decoding processing units ex1001 and ex1002 are not necessarily specialized for the processing of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method in the present invention and the moving picture decoding method in conformity with the conventional standard.

INDUSTRIAL APPLICABILITY

The image coding method and the image decoding method according to the present disclosure can be applied to various kinds of multimedia data to improve coding efficiency. For example, the image coding method and the image decoding method according to the present disclosure are useful for mobile telephones, DVD apparatuses, personal computers, and the like.

The invention claimed is:

1. An image coding method of coding images to generate a coded stream, said image coding method comprising:
    writing a first parameter into a sequence parameter set in the coded stream to be generated, the first parameter representing a first bit-depth that is a bit-depth of a reconstructed sample in the images; and
    writing a second parameter different from the first parameter into the sequence parameter set, the second parameter representing a second bit-depth that is a bit-depth of an Intra Pulse Code Modulation (IPCM) sample in the images.

2. The image coding method according to claim 1, further comprising
    writing the IPCM sample into the coded stream at the second bit-depth.

3. The image coding method according to claim 1, further comprising
    reconstructing a sample at the first bit-depth from a coded sample in the images, so as to generate the reconstructed sample.

4. An image coding apparatus that codes images to generate a coded stream, said image coding apparatus comprising:
    a first writing unit configured to write a first parameter into a sequence parameter set in the coded stream to be generated, the first parameter representing a first bit-depth that is a bit-depth of a reconstructed sample in the images; and
    a second writing unit configured to write a second parameter different from the first parameter into the sequence parameter set, the second parameter representing a second bit-depth that is a bit-depth of an Intra Pulse Code Modulation (IPCM) sample in the images.

* * * * *